US011891846B2

(12) United States Patent
Romero et al.

(10) Patent No.: US 11,891,846 B2
(45) Date of Patent: Feb. 6, 2024

(54) LOCKSET FOR INTERIOR SLIDING DOOR

(71) Applicant: ASSA ABLOY Americas Residential Inc., New Haven, CT (US)

(72) Inventors: Oscar Romero, Lake Forest, CA (US); Scott Calvin Baker, Lake Forest, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 0 days.

(21) Appl. No.: 17/936,033

(22) Filed: Sep. 28, 2022

(65) Prior Publication Data

US 2023/0089580 A1 Mar. 23, 2023

Related U.S. Application Data

(63) Continuation of application No. 17/028,354, filed on Sep. 22, 2020, now Pat. No. 11,473,351.

(Continued)

(51) Int. Cl.

*E05C 9/04* (2006.01)
*E05B 63/20* (2006.01)
*E05B 65/08* (2006.01)

(52) U.S. Cl.

CPC ............ *E05C 9/041* (2013.01); *E05B 63/202* (2013.01); *E05B 65/0864* (2013.01)

(58) Field of Classification Search

CPC .. Y10S 292/04; Y10S 292/037; Y10S 292/46; Y10S 292/37; Y10S 292/65;

(Continued)

(56) References Cited

U.S. PATENT DOCUMENTS 1,580,611 A * 4/1926 Kirkpatrick ......... E05B 65/0864 292/60
2,565,873 A * 8/1951 Meyer ...................... G05G 7/06 292/99

(Continued)

FOREIGN PATENT DOCUMENTS

CN 1089680 A 7/1994
CN 102434042 A 5/2012

(Continued)

OTHER PUBLICATIONS

PCT international Search Report and Written Opinion in Application PCT/US2020/052000, dated Dec. 23, 2020, 15 pages.

(Continued)

*Primary Examiner* — Kristina R Fulton
*Assistant Examiner* — Steven A Tullia
(74) *Attorney, Agent, or Firm* — Merchant & Gould P.C.

(57) ABSTRACT

A door lockset for a sliding door includes a latch assembly, a plunger, a plunger retention assembly, and a secondary unlocking feature. The latch assembly has a first end and a second end. The plunger is positioned at least partially within the latch assembly. The plunger is movable between an extended position and a retracted position relative to the second end of the latch assembly. The plunger retention assembly has a first end having a recess, a second end opposing the first end, and an actuation member positioned at least partially within the plunger retention assembly. The plunger is configured to engage the recess in the extended position.

18 Claims, 20 Drawing Sheets

Related U.S. Application Data

(60) Provisional application No. 62/968,731, filed on Jan. 31, 2020, provisional application No. 62/904,101, filed on Sep. 23, 2019.

(58) Field of Classification Search
CPC ...... Y10S 292/29; E05C 19/02; E05C 19/028; E05C 9/041; E05B 65/08; E05B 65/0864; E05B 63/18; E05B 63/20; E05B 63/22; E05B 63/202; E05B 63/248; Y10T 292/06; Y10T 292/18; Y10T 292/696
USPC .............. 292/341.15, 137, 138, 163, 174, 1; 49/449
See application file for complete search history.

(56) References Cited

U.S. PATENT DOCUMENTS

| | | | | | |
|---|---|---|---|---|---|
| 2,720,795 | A | * | 10/1955 | Mapson | F16B 2/248 74/612 |
| 3,025,096 | A | * | 3/1962 | Williams | E05C 1/163 70/216 |
| 3,931,723 | A | | 1/1976 | Kurtz | |
| 4,099,756 | A | | 7/1978 | Kagoura | |
| 4,132,439 | A | | 1/1979 | Millar | |
| 4,400,027 | A | * | 8/1983 | Nahon | E05B 65/0864 292/288 |
| 5,290,077 | A | | 3/1994 | Fleming | |
| 5,498,039 | A | * | 3/1996 | Bivens | B60N 3/08 292/145 |
| 5,816,629 | A | | 10/1998 | Donald | |
| 6,250,694 | B1 | * | 6/2001 | Weiland | E05C 19/022 292/121 |
| 11,473,351 | B2 | | 10/2022 | Romero et al. | |
| 2006/0103148 | A1 | * | 5/2006 | Rechberg | A47B 88/463 292/304 |
| 2009/0267361 | A1 | * | 10/2009 | Alber | E05C 19/008 292/216 |

FOREIGN PATENT DOCUMENTS

| | | | | | |
|---|---|---|---|---|---|
| CN | 102913056 | A | | 2/2013 | |
| CN | 202945889 | U | | 5/2013 | |
| CN | 203066667 | U | | 7/2013 | |
| CN | 107100455 | | | 8/2017 | |
| CN | 107100455 | A | * | 8/2017 | E05B 15/00 |
| CN | 107223175 | A | | 9/2017 | |
| EP | 2792828 | | | 10/2014 | |
| EP | 2792828 | A2 | * | 10/2014 | E05B 63/24 |
| JP | H09228715 | | | 9/1997 | |
| JP | H09228715 | A | * | 9/1997 | |
| JP | 2003-097119 | | | 4/2003 | |
| KR | 930002990 | | | 5/1993 | |
| KR | 200163334 | Y1 | * | 2/2000 | |
| KR | 200163334 | Y1 | | 2/2000 | |
| KR | 101252697 | B1 | | 4/2013 | |
| KR | 101252697 | B1 | * | 4/2013 | |
| KR | 10-1761747 | | | 7/2017 | |
| KR | 101761747 | B1 | | 7/2017 | |

OTHER PUBLICATIONS

PCT International Preliminary Report on Patentability in Application PCT/US2020/052000, dated Apr. 7, 2022, 12 pages.

Chinese 1st Office Action and Search Report in Application 202080072358.9, dated Feb. 20, 2023, 25 pages (with English translation).

Chinese 2nd Office Action and Search Report in Application 202080072358.9, dated Jul. 11, 2023, 16 pages (with English translation).

Chinese Notice of Allowance in Application 202080072358.9, dated Sep. 27, 2023, 7 pages (with English translation).

* cited by examiner

LOCKSET FOR INTERIOR SLIDING DOOR

CROSS-REFERENCE TO RELATED APPLICATION

This application is a continuation of U.S. patent application Ser. No. 17/028,354, now U.S. Pat. No. 11,473,351, filed Sep. 22, 2020; which claims benefit of U.S. Provisional Application Ser. No. 62/968,731, filed Jan. 31, 2020; and 62/904,101, filed Sep. 23, 2019, the disclosures of which are hereby incorporated by reference in their entireties.

TECHNICAL FIELD

This disclosure relates to the field of door locks. More particularly, this disclosure relates to door locksets for sliding doors.

BACKGROUND

Sliding interior doors (known as "barn doors"), have become very popular recently. Such sliding doors are often hung using a roller bracket and will slide along a rail mounted above a doorway, e.g., either inside or outside the doorway. Traditional locks provide a privacy locking function on an interior sliding door (bathroom, bedroom, home office, TV room, etc.). Although sliding doors are popular for aesthetic reasons, such traditional locks are not suitable for use with sliding doors. Still further, because sliding doors may be hung from rails positioned either inside or outside of the room in which a privacy locking function is desired, any existing locking solutions may not be suitable for all mounting possibilities.

Existing solutions have a number of shortcomings. For example, in some instances, locking mechanisms can only lock the door on one side, such as in the case of a hook-and-eye. Still further, in some instances, locks can only be installed either on the outside or the inside of the door exclusively, and therefore separate solutions are required for each possible installation configuration, leading to consumer confusion at a point of sale.

Additionally, such traditional sliding door locks having privacy lock features lack the ability to be unlocked from the "other" (outside) side of the door in the case of an emergency situation (e.g., a child not able to unlock the door from within the room in which privacy is sought).

SUMMARY

The present disclosure relates generally to door locks, specifically for sliding doors. Generally, a sliding door lockset as described can be installed on a sliding door located on the interior or exterior of a room.

In one example of the present disclosure, a door lockset for a sliding door is described. The door lockset includes a latch assembly, a plunger, a plunger retention assembly, and a secondary unlock feature. The latch assembly has a first end and a second end. The plunger is positioned at least partially within the latch assembly. The plunger is movable between an extended position and a retracted position relative to the second end of the latch assembly. The plunger retention assembly includes a first end having a recess, a second end, and an actuation member positioned at least partially within the plunger retention assembly. The plunger is configured to engage the recess in the extended position.

In another example of the present disclosure, a door lockset for a sliding door is described. The door lockset includes a latch assembly, a plunger, a handle, and a plunger retention assembly. The latch assembly has a first end and a second end. The plunger is positioned at least partially within the latch assembly. The plunger is movable between an extended position and a retracted position relative to the second end of the latch assembly. The handle is located on a first end of the plunger and is in communication with the plunger to move the plunger between the retracted position and the extended position. The plunger retention assembly includes a first end having a recess, a second end having a stationary plate, and an actuation member positioned at least partially within the plunger retention assembly. The plunger is configured to engage the recess in the extended position.

In yet another example of the present disclosure, an alternative door lockset for a sliding door is described. The door lockset includes a latch assembly, a plunger, and a plunger retention assembly. The latch assembly has a first end and a second end. The plunger is positioned at least partially within the latch assembly. The plunger is movable between an extended position and a retracted position relative to the second end of the latch assembly. The plunger retention assembly includes a first end having a recess, a second end, and an actuation member. The actuation member comprises a rod and is positioned at least partially within the plunger retention assembly. The plunger retention assembly includes a pushbutton on the second end. The pushbutton is connected to the rod extending through the plunger retention assembly. The rod is configured to engage the plunger to move the plunger between the retracted position and the extended position. The plunger is configured to engage the recess in the extended position.

In yet another example of the present disclosure, a plunger retention assembly for a sliding door is disclosed. The plunger retention assembly includes a first body positioned at a first end and a second body positioned at a second end. The first body and the second body are connected to one another to form an interior of the plunger retention assembly. The plunger retention assembly includes a plunger positioned at least partially within the interior. The plunger at least partially extends a user definable distance from the first end. The plunger retention assembly includes a pushbutton movably positioned at the second end. The pushbutton is connected to the plunger within the interior. Upon movement of the pushbutton into the interior, the plunger extends further from the first end.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION

Figure 1:
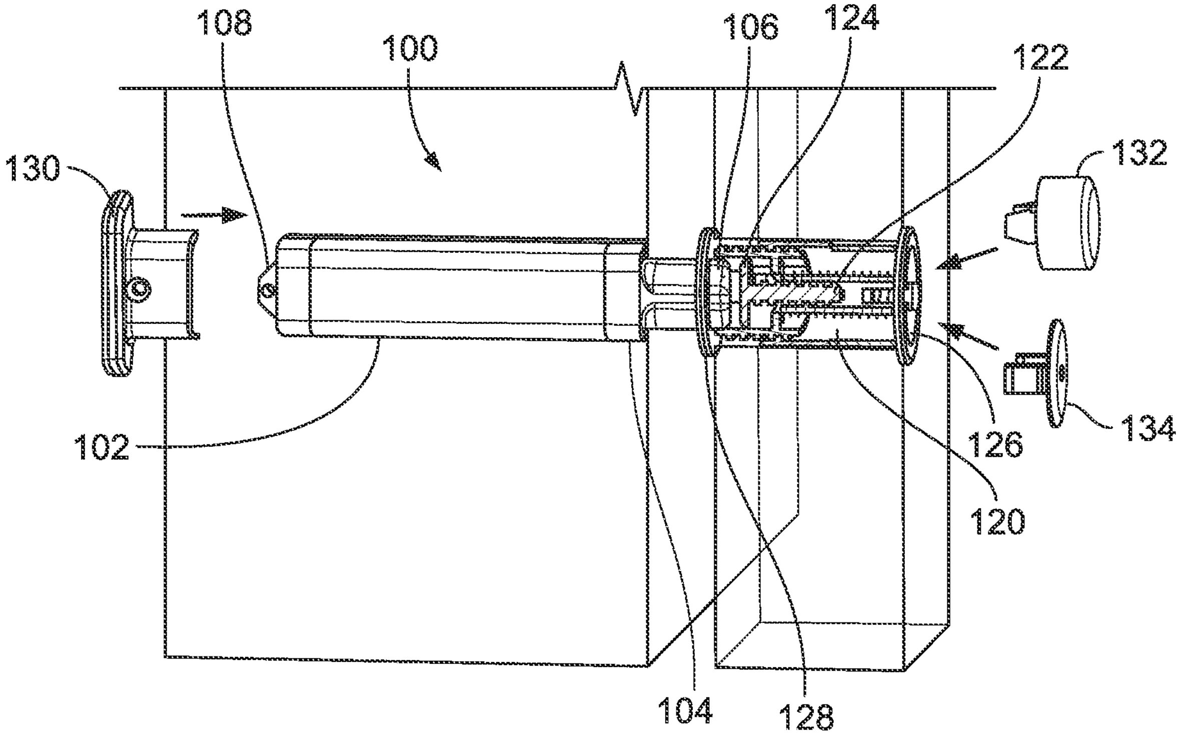
FIG. 1 illustrates an example embodiment of a door lockset.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The door lockset described herein is configured to be installed on a sliding door, regardless of whether the sliding door is mounted inside the room or outside the room. In a further embodiment, the door lockset can include interchangeable pieces to install the door lockset on a sliding door mounted inside a room or outside a room. In addition, the door lockset described herein may include an alternative unlock feature, or an emergency unlock feature that can be used in emergency situations to unlock the lock from outside of the room.

FIG. 1 illustrates an example embodiment of a door lockset 100. The door lockset 100 includes a latch assembly 102 and a plunger retention assembly 120. The latch assembly 102 has a first end 108 and a second end 104. A plunger 106 extends through the plunger retention assembly 120, and is capable of extending through the first end 108 and/or the second end 104.

An optional handle 130 is capable of being attached to the plunger 106. The handle 130 may be a variety of different handle types, such as levers, turnable knobs, or pushable knobs. While not to be seen as limiting, a handle 130 as described below is in reference to a pushable knob. In some examples, the handle 130 is attached to the plunger via a fastener such as a screw, bolt, adhesive, etc.

The plunger retention assembly 120 includes a first end 128 and a second end 126. The plunger retention assembly 120 also includes a rod 122 connected to a plunger engagement member 124 that extends at least partially through an interior of the plunger retention assembly 120. The first end 128 also includes a recess that is capable of accepting an end of the plunger 106.

The plunger retention assembly is capable of accepting a plurality of end caps at the second end 126. A first end cap may be a pushbutton 132. A second end may be a faceplate 134.

In an example embodiment, the latch assembly 102 is installed on a door jamb, and the plunger retention assembly 120 is installed on a sliding door 105. The door lockset 100 is capable of being installed on a sliding door that is mounted inside a room or a sliding door that is mounted outside a room.

Figure 2:
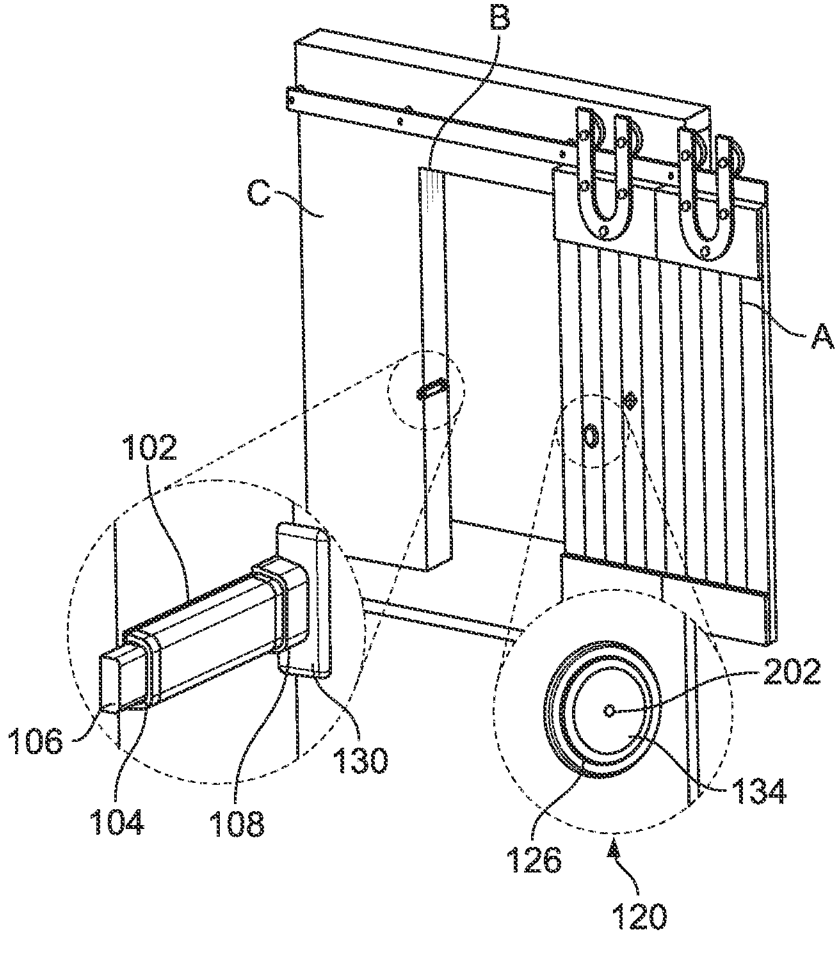
FIG. 2 is an example embodiment of a door lockset for a door mounted outside a room.

FIG. 2 illustrates an example embodiment of the door lockset 100 installed on the sliding door A that is mounted outside a room. A door mounted outside a room is a sliding door in which mounting brackets on which the sliding door may ride are outside the room.

The latch assembly 102 is installed at a door jamb B, and the plunger retention assembly 120 is installed on the door A. As shown, the latch assembly 102 has a longitudinal axis that is installed at a right angle to the door jamb B and parallel to the floor. The plunger 106 is movable through the latch assembly 102 along the longitudinal axis.

The plunger retention assembly 120 is installed in the sliding door A through a bore hole. The plunger retention assembly 120 also has a longitudinal axis, the longitudinal axis being perpendicular to the door A, and parallel to the floor.

In the embodiment shown, the plunger retention assembly 120 includes a faceplate 134 on the second end 126. The faceplate 134 includes an alternative unlock feature 202. The alternative unlock feature 202 allows the door lockset 100 to be unlocked from the outside of the room in an emergency situation. In some examples, the unlock feature 202 is accessible through the handle 130.

Figure 3:
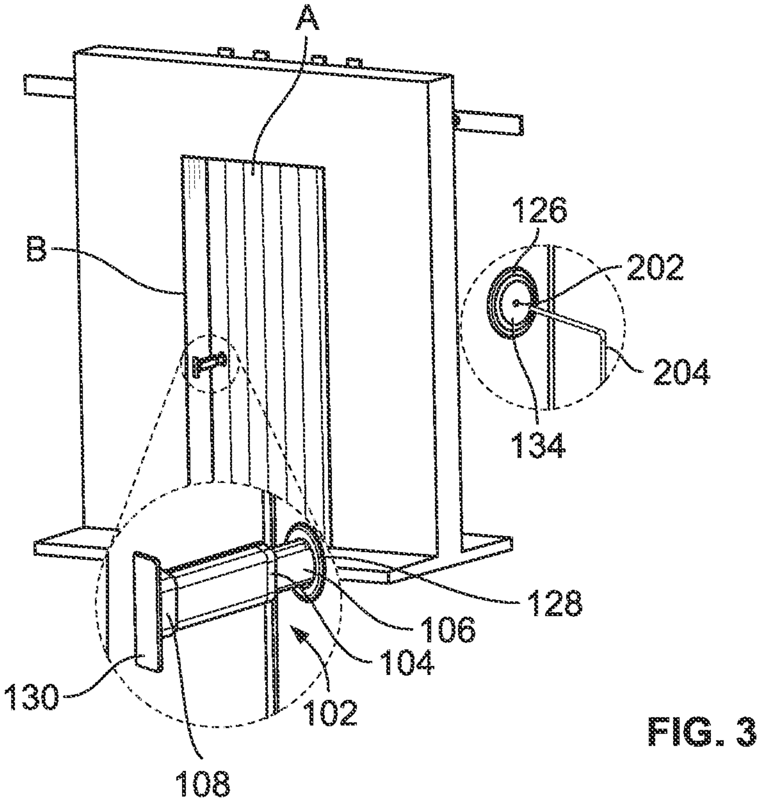
FIG. 3 is an example embodiment of the door lockset of FIG. 2 on an opposing side of the door.

FIG. 3 illustrates a view from the interior of the room to be locked by the door lockset 100 of FIG. 2. In the embodiment shown, the sliding door is in a locked configuration. When the plunger 106 is in an extended position, the door A is locked.

The latch assembly 102 is installed on the door jamb B. The latch assembly 102 includes the handle 130 extending from the first end 108. The handle 130 is attached or otherwise in communication with the plunger 106. The handle 130 extends into the room, and is capable of being actuated by a user. When the handle 130 is actuated, the plunger 106 moves from a retracted position to an extended position or from an extended position to a retracted position. When the plunger 106 is in an extended position, an end of the plunger 106 resides in a recess of the plunger retention assembly 120 and the door A is locked.

The plunger retention assembly 120 includes a recess on the first end 128. The recess is sized to accept the plunger 106.

The plunger retention assembly 120 also includes a faceplate 134 on the second end 126. The faceplate 134 includes an alternative unlock feature 202. An alternative unlocking device 204 is capable of communicating with alternative unlock feature 202 to unlock the door lockset 100 from outside of the room, for example in an emergency situation.

Figure 4:
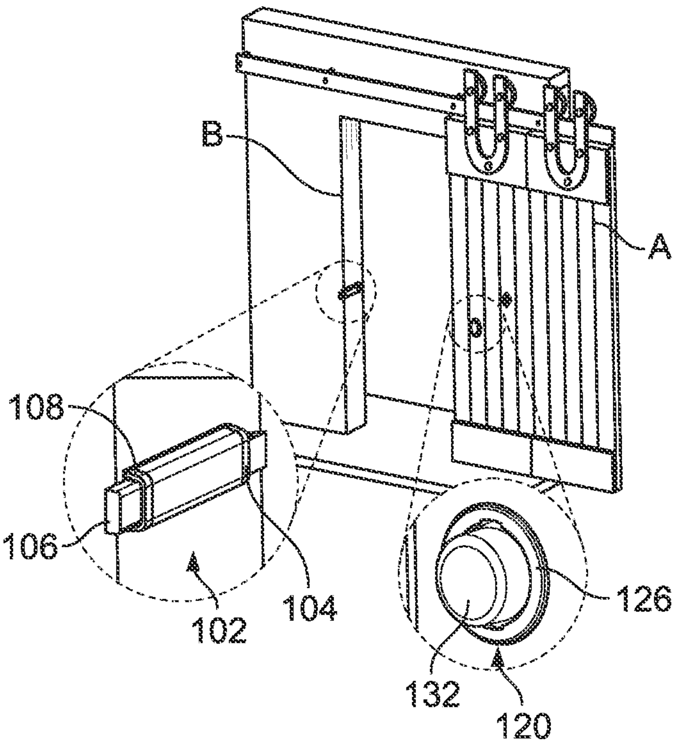
FIG. 4 is another example embodiment of a door lockset for a door mounted inside a room.

FIG. 4 illustrates an example embodiment of a door lockset 100 for a sliding door that is mounted inside the room to be locked.

The latch assembly 102 is installed at a door jamb B, and the plunger retention assembly 120 is installed on a door A. As shown, the latch assembly 102 has a longitudinal axis that is installed at a right angle to the door jamb B. The plunger 106 is movable through the latch assembly 102 along the longitudinal axis.

The plunger retention assembly 120 is installed in the sliding door A through a bore hole. The plunger retention assembly 120 also has a longitudinal axis, the longitudinal axis being perpendicular to the door A.

In the embodiment shown, the plunger retention assembly 120 includes a pushbutton 132 on the second end 126. The pushbutton 132 is capable of being depressed by a user. The pushbutton 132 is in communication with an actuation member (not shown) which is capable of causing the plunger 106 to move to the extended position. The pushbutton 132 is described in more detail at FIGS. 8*a*-8*d* and 9*a*-9*b*.

The alternative unlock feature 202 allows the door lockset 100 to be unlocked from the exterior of the room in an emergency situation. The alternative unlock feature 202 is described in more detail at FIGS. 5 and 7.

Figure 5:
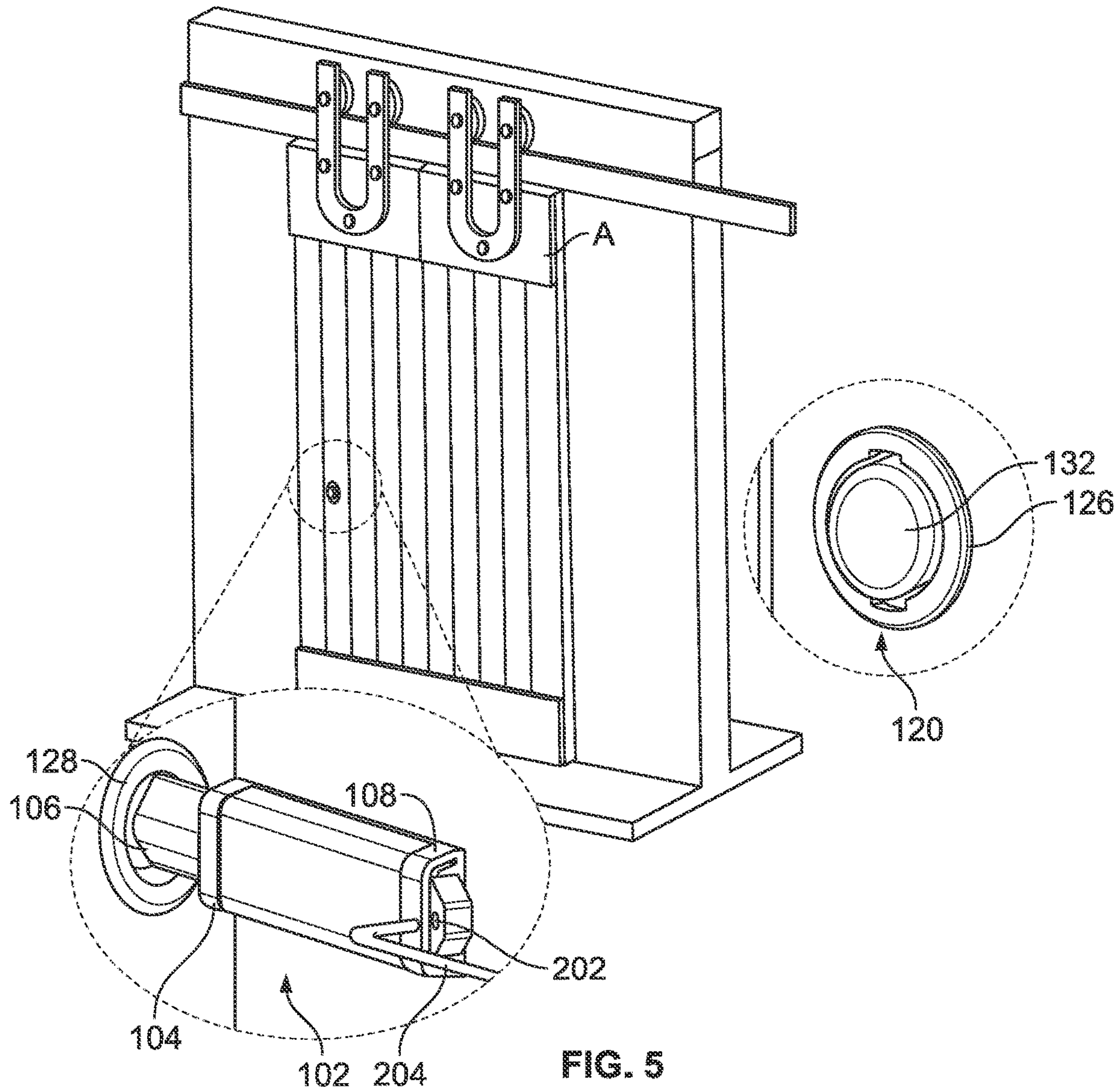
FIG. 5 is an example embodiment of the door lockset of FIG. 4 on an opposing side of the door.

FIG. 5 illustrates a view from the interior of the room of the door lockset 100 of FIG. 4. In the embodiment shown, the door lockset 100 is in a locked configuration. When the plunger 106 is in an extended position, the door A is locked.

The latch assembly 102 is installed on the door jamb (not shown). The latch assembly 102 includes the plunger 106 extending through the latch assembly 102, and at least partially through the first end 108 and/or the second end 104. An end of the plunger 106 includes an alternative unlock feature 202. An alternative unlocking device 204 is capable of communicating with alternative unlock feature 202 to unlock the door lockset 100 from an outside of the room, for example in an emergency situation.

The plunger retention assembly 120 includes the pushbutton 132 on the second end 126. The pushbutton 132 is in communication with the plunger 106, and when the pushbutton 132 is depressed, the plunger 106 moves to the extended position to be in a locked configuration or the plunger 106 moves to a retracted position to be in an unlocked configuration.

Figure 6:
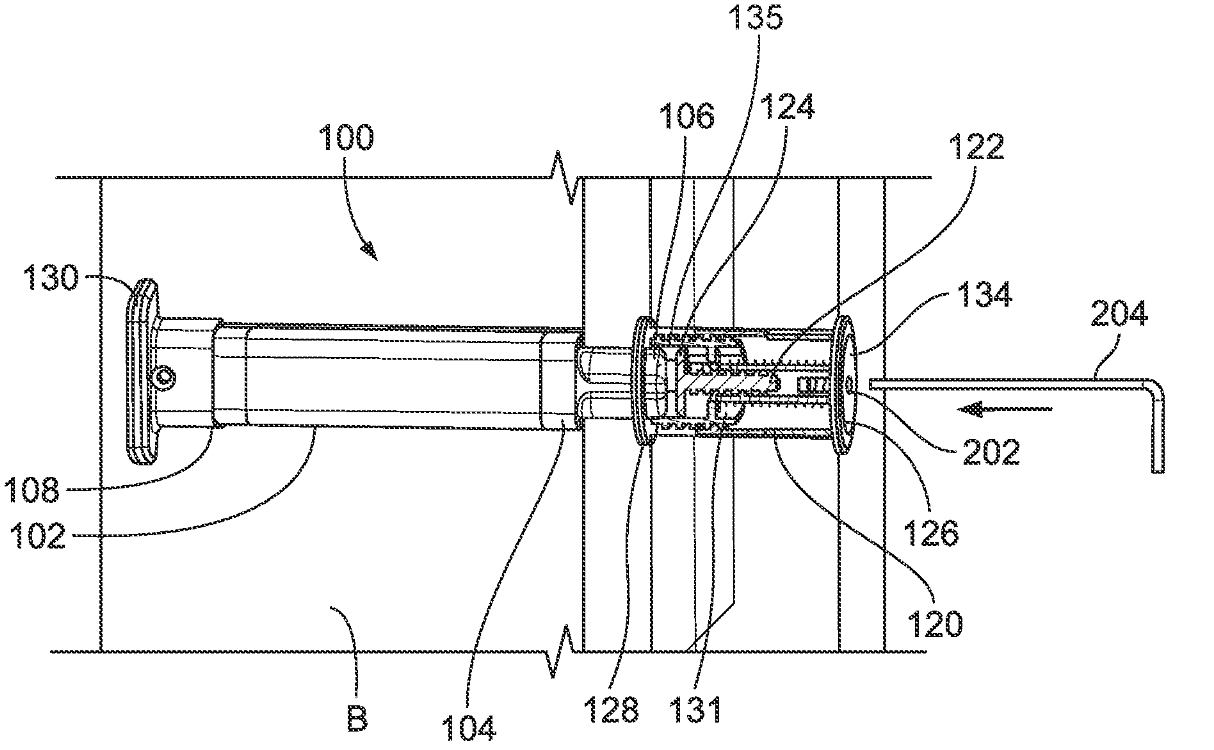
FIG. 6 illustrates an example embodiment of a door lockset for a door mounted outside the room.

FIG. 6 illustrates a cross sectional view of the plunger retention assembly 120 of the door lockset 100 for use with a sliding door mounted outside the room. The latch assembly 102 is installed on a door jamb B. The latch assembly 102 includes the plunger 106, which in this embodiment, extends outward from the second end 104. A handle 130 is located at the first end 108 of the latch assembly 102. The handle 130 is in communication with the plunger 106, wherein actuation of the handle 130 causes movement of the plunger 106. A user can actuate the handle 130 by sliding it along the longitudinal axis. For example, the plunger 106 can move from the retracted position to the extended position when the door lockset 100 is desired to be locked. Alternatively, the plunger 106 can move from the extended position to the retracted position when the door lockset 100 is desired to the unlocked.

The plunger 106 is configured to extend into a recess 135 of the plunger retention assembly 120 in the extended position. The recess is located at the first end 128 of the plunger retention assembly 120.

The plunger retention assembly 120 is configured to be installed in a bore hole of the door. The example illustrates a cross-sectional view of the plunger retention assembly 120. The plunger retention assembly includes a rod 122 connected to a plunger engagement member 124. The plunger engagement member 124 is located near the first end 128. The first end 128 and the second end 126 of plunger engagement member 124 are moveably attached to each other to accommodate different door widths. The first end 128 is received by the second end 126 and maintained by a connection mechanism 131. In an example, the connection mechanism 131 is a threaded fit; however, alternative connection mechanisms are possible such as friction fit or other similar connections.

In use, a user actuates the handle 130 which causes the plunger 106 to move from a retracted position to an extended position where the end of the plunger 106 is within the recess of the plunger retention assembly 120. If a user needs to unlock the door from the outside of the room, for example in an emergency situation, the user can use the alternative unlocking device 204 and insert it into the alternative unlock feature 202. The alternative unlocking device 204 is capable of engaging the rod 122 which moves the plunger engagement member 124 and moves the plunger 106 from the extended position to the retracted position to unlock the door lockset 100.

Figure 7:
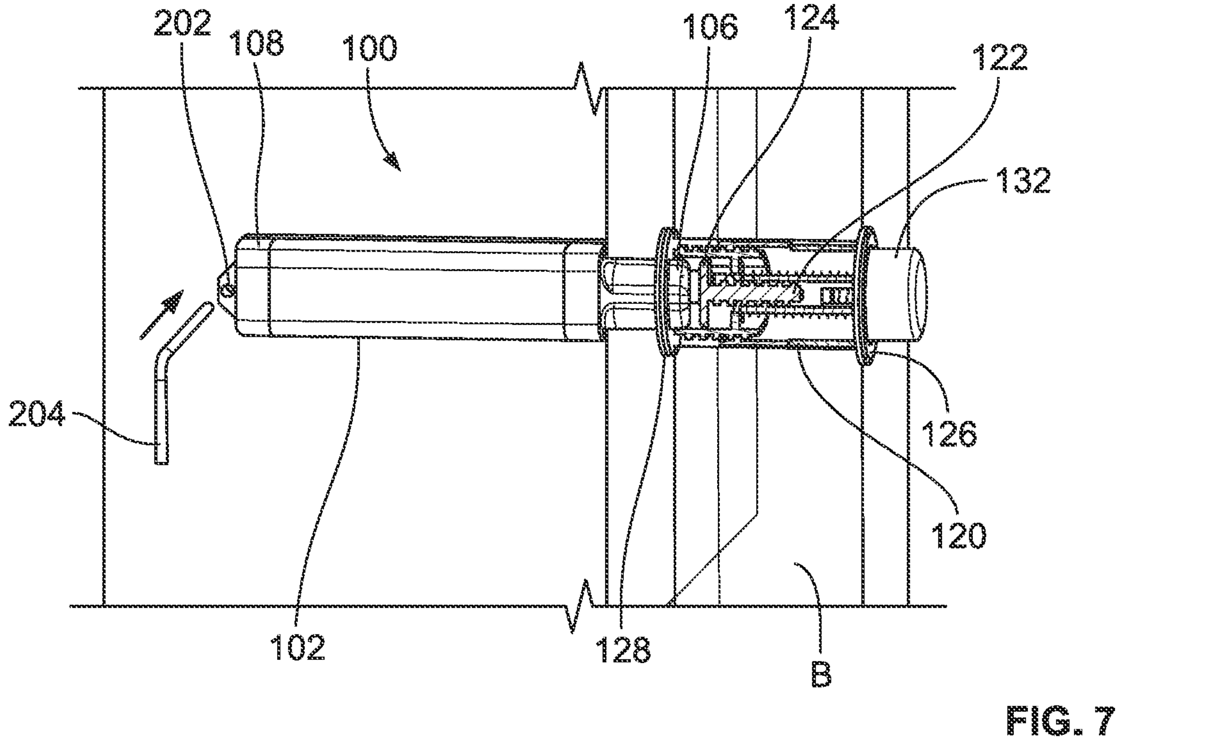
FIG. 7 illustrates an example embodiment of a door lockset for a door mounted inside the room.

FIG. 7 illustrates an example door lockset 100 for use with a sliding door mounted inside the room. The latch assembly 102 is installed on a door jamb B on a wall C. The latch assembly 102 includes the plunger 106, which in this embodiment extends through the second end 104 and through the first end 108.

The plunger 106 is configured to extend into a recess of the plunger retention assembly 120 in the extended position. The recess is located at the first end 128 of the plunger retention assembly 120.

The plunger retention assembly 120 includes the pushbutton 132 at the second end 126. The example illustrates a cross-sectional view of the plunger retention assembly 120. The plunger retention assembly includes the rod 122 connected to the plunger engagement member 124. The plunger engagement member 124 is located near the first end 128 and is capable of extending through the first end 128.

In use, a user actuates the pushbutton 132 which engages the plunger 106 and causes the plunger 106 to move from a retracted position to an extended position where the end of the plunger 106 is within the recess of the plunger retention assembly 120.

If a user needs to unlock the door from the outside of the room, for example in an emergency situation, the user can use the alternative unlocking device 204 and insert it into the alternative unlock feature 202. The alternative unlocking device 204 is capable of moving the plunger 106 from the extended position to the retracted position.

FIGS. 8*a*-8*d* illustrate an example locking process for the door lockset 100 configured to be installed on a sliding door mounted inside the room. Such a door lockset 100 does not include a handle and includes a pushbutton 132. In an alternative embodiment, a handle may be used that when actuated, causes the plunger 106 to move in the method described below.

Figure 8A:
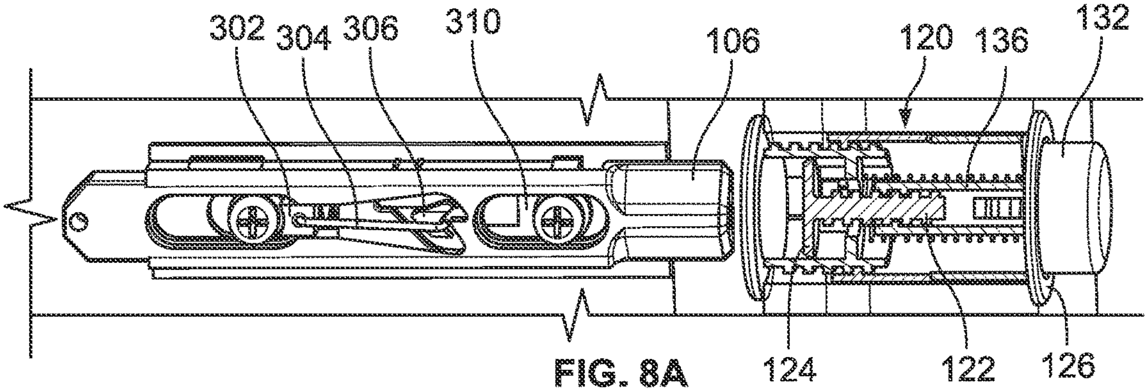
FIGS. 8*a*-8*d* illustrate an example locking sequence of a door lockset.

FIG. 8*a* illustrates a configuration when the door lockset 100 is unlocked. The pushbutton 132 is extended from a neutral position, outward from the second end 126. The rod 122 and plunger engagement member 124 are located within the plunger retention assembly 120, and the plunger engagement member 124 is not in contact with the plunger 106. The rod 122 extends into a plunger receiver 136. In this configuration, the plunger 106 is in the retracted position.

When the plunger 106 is in the retracted position, a first block 302, a connecting member 304, and a guide member 306 are in a neutral position. The connecting member 304 is located on a hook of the guide member 306.

In this configuration, a spring (not shown) is in a compressed configuration as the first block 302 and the guide member 306 compresses the spring (not shown).

Figure 8B:
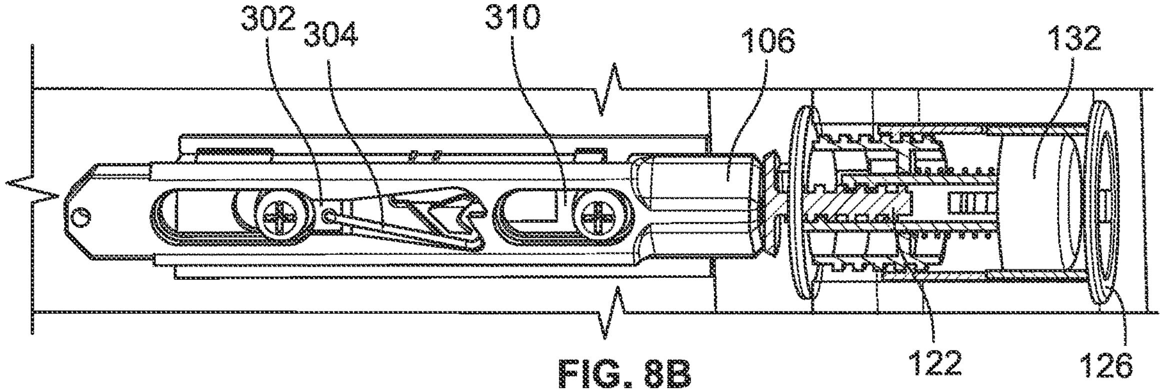

FIG. 8*b* illustrates a configuration of the door lockset 100 when a user is actuating the pushbutton 132. In this embodiment, the pushbutton 132 is depressed. This causes the rod 122 to extend toward the plunger 106 and plunger engagement member 124 to come into communication with the plunger 106. The plunger engagement member 124 extends outward past the first end 128 to make contact with the plunger 106.

The connecting member 304 moves along the guide member 306, and causes the guide member 306 to move towards the first block 302. A movable block 310 is moved towards the first end 108 of the latch assembly 102. A spring (not shown) begins to expand to an expanded configuration, which causes the plunger 106 to extend to the extended position.

Figure 8C:
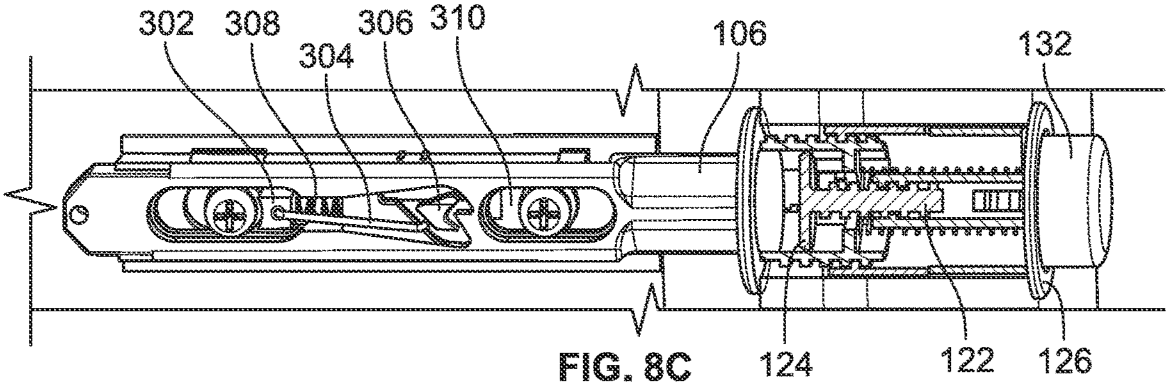

FIG. 8*c* illustrates a configuration of the door lockset 100 in the process of being locked. The pushbutton 132 has been released, and the rod 122 and plunger engagement member 124 are not in contact with the plunger 106. The plunger 106 is in an extended position, and is located within the recess of the plunger retention assembly 120.

The connecting member 304 moves along the guide member 306, as the spring 308 expands back to the uncompressed configuration.

Figure 8D:
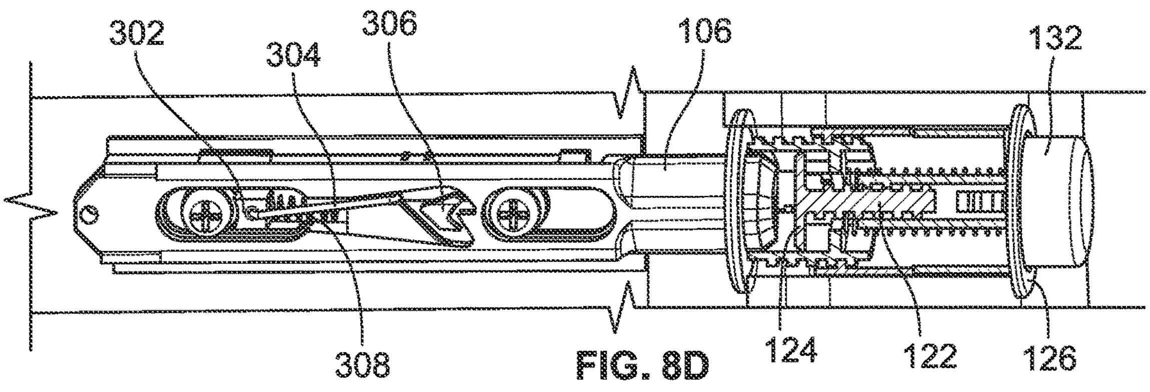

FIG. 8*d* illustrates a configuration of the door lockset 100 in a locked configuration. The plunger 106 resides within the recess of the plunger retention assembly 120 to maintain a locked configuration. The connecting member 304 moves along the guide member 306 to compress the spring 308.

FIGS. 9*a*-9*d* illustrate an example unlocking process for door lockset 100 configured to be installed on a sliding door mounted inside the room.

Figure 9A:
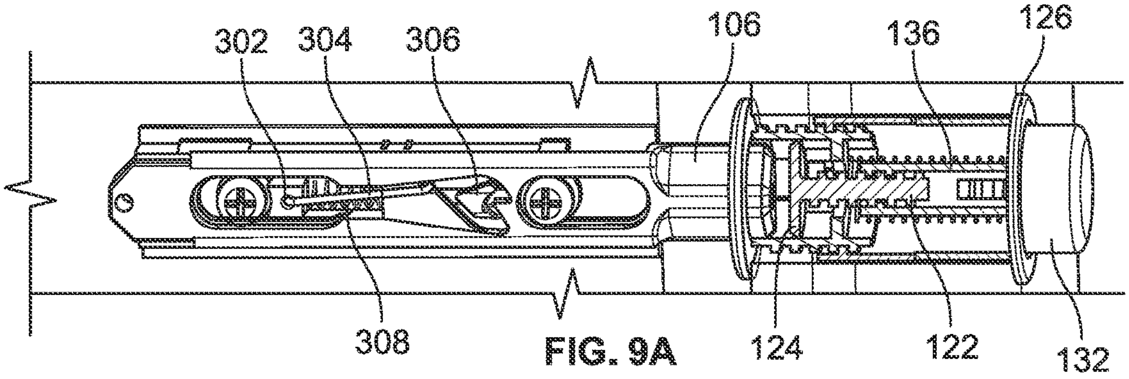
FIGS. 9*a*-9*d* illustrate an example unlocking sequence of a door lockset.

FIG. 9*a* illustrates a configuration of the door lockset 100 in a locked configuration. The plunger 106 resides within the recess of the plunger retention assembly 120 to maintain a locked configuration. The connecting member 304 and the guide member 306 compress the spring 308.

Figure 9B:
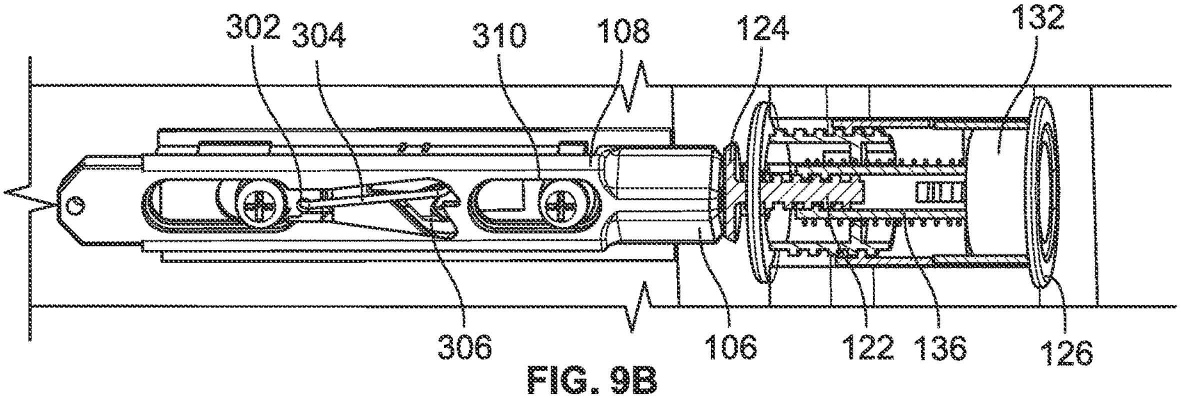

FIG. 9*b* illustrates a configuration of the door lockset 100 when a user is actuating the pushbutton. In the embodiment, the pushbutton 132 is depressed. This causes the rod 122 to extend toward the plunger 106 and plunger engagement member 124 to come into communication with the plunger 106. The plunger engagement member 124 extends outward past the first end 128 to make contact with the plunger 106.

The connecting member 304 moves along the guide member 306, and causes the guide member 306 to move towards the first block 302. The movable block 310 is moved towards the first end 108 of the latch assembly 102. A spring (not shown) begins to expand to a non-compressed configuration, which causes the plunger 106 to extend to the extended position.

Figure 9C:
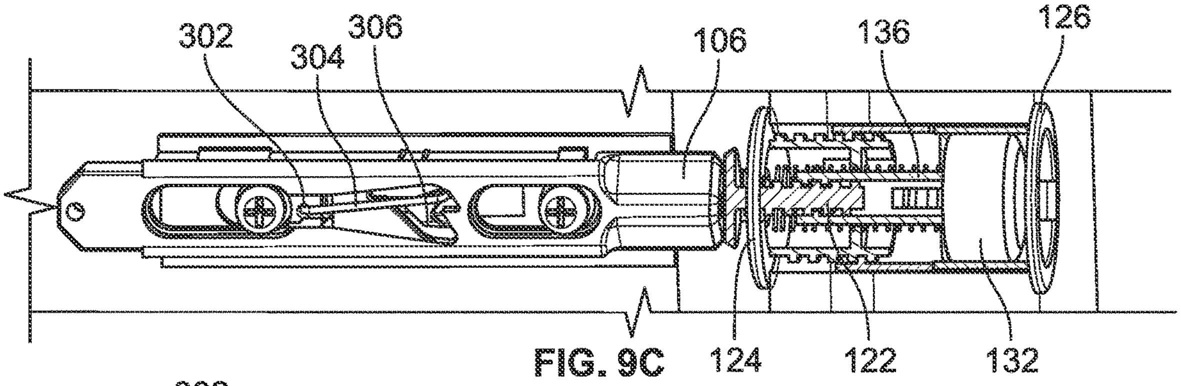

FIG. 9*c* illustrates a configuration of the door lockset 100 in the process of being unlocked. The pushbutton 132 is extended from a neutral position, inward from the second end 126. The rod 122 and plunger engagement member 124 are located outside the plunger retention assembly 120, and the plunger engagement member 124 is in contact with the plunger 106. In this configuration, the plunger 106 is in the retracted position.

When the plunger 106 is in the retracted position, the first block 302, the connecting member 304, and the guide member 306 are in a neutral position. The connecting member 304 is located on a hook of the guide member 306. A spring (not shown) is compressed by the first block 302 and the guide member 306.

Figure 9D:
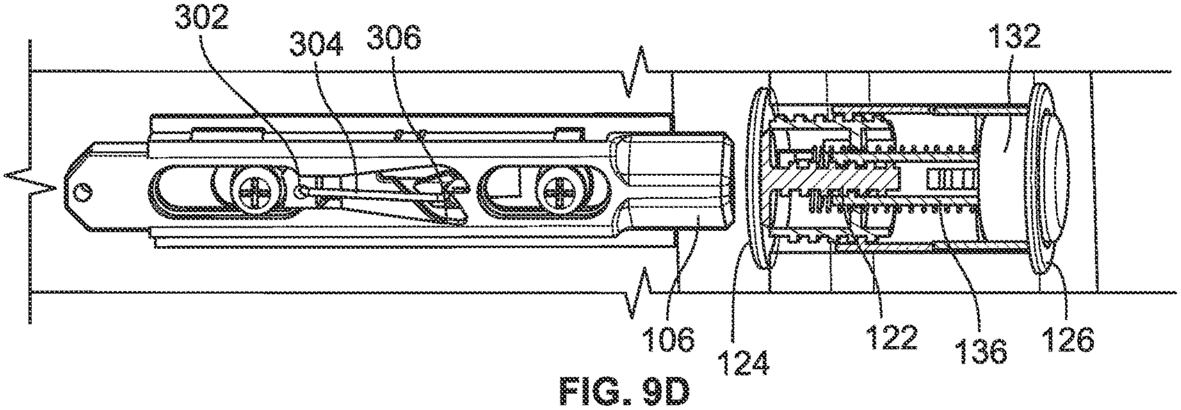

FIG. 9*d* illustrates a configuration of the door lockset 100 in an unlocked configuration. The pushbutton 132 is extended from a neutral position, outward from the first end 128. The rod 122 and plunger engagement member 124 are located within the plunger retention assembly 120, and the plunger engagement member 124 is not in contact with the plunger 106. In this configuration, the plunger 106 is in the retracted position.

When the plunger 106 is in the retracted position, the first block 302, the connecting member 304, and the guide member 306 are in a neutral position and the spring (not shown) is compressed. The connecting member 304 is located on a hook of the guide member 306.

Figure 10:
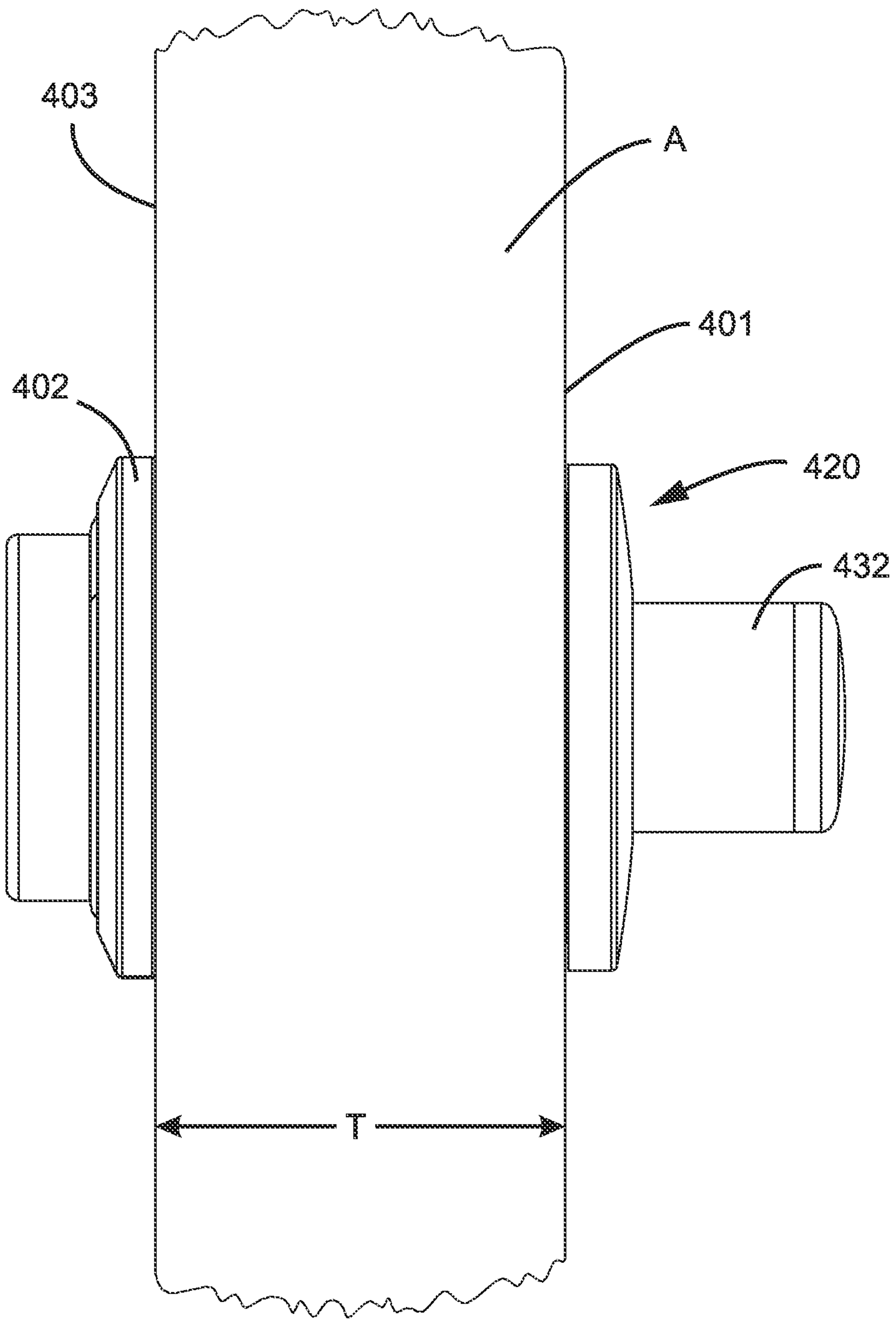
FIG. 10 illustrates an example embodiment of a plunger retention assembly installed on a door.

FIG. 10 shows a plunger retention assembly 420 installed in a bore hole of the door A. The plunger retention assembly 420 is substantially similar to the plunger retention assembly 120, described above. The door A includes a user side 401 and a door jamb side 403. As shown, the plunger retention assembly 420 includes a pushbutton 432 installed on the user side 401 of the door A. A flange 402, that is user adjustable based on a thickness T of the door A, is installed on the door jamb side 403 of the door A.

Figure 11:
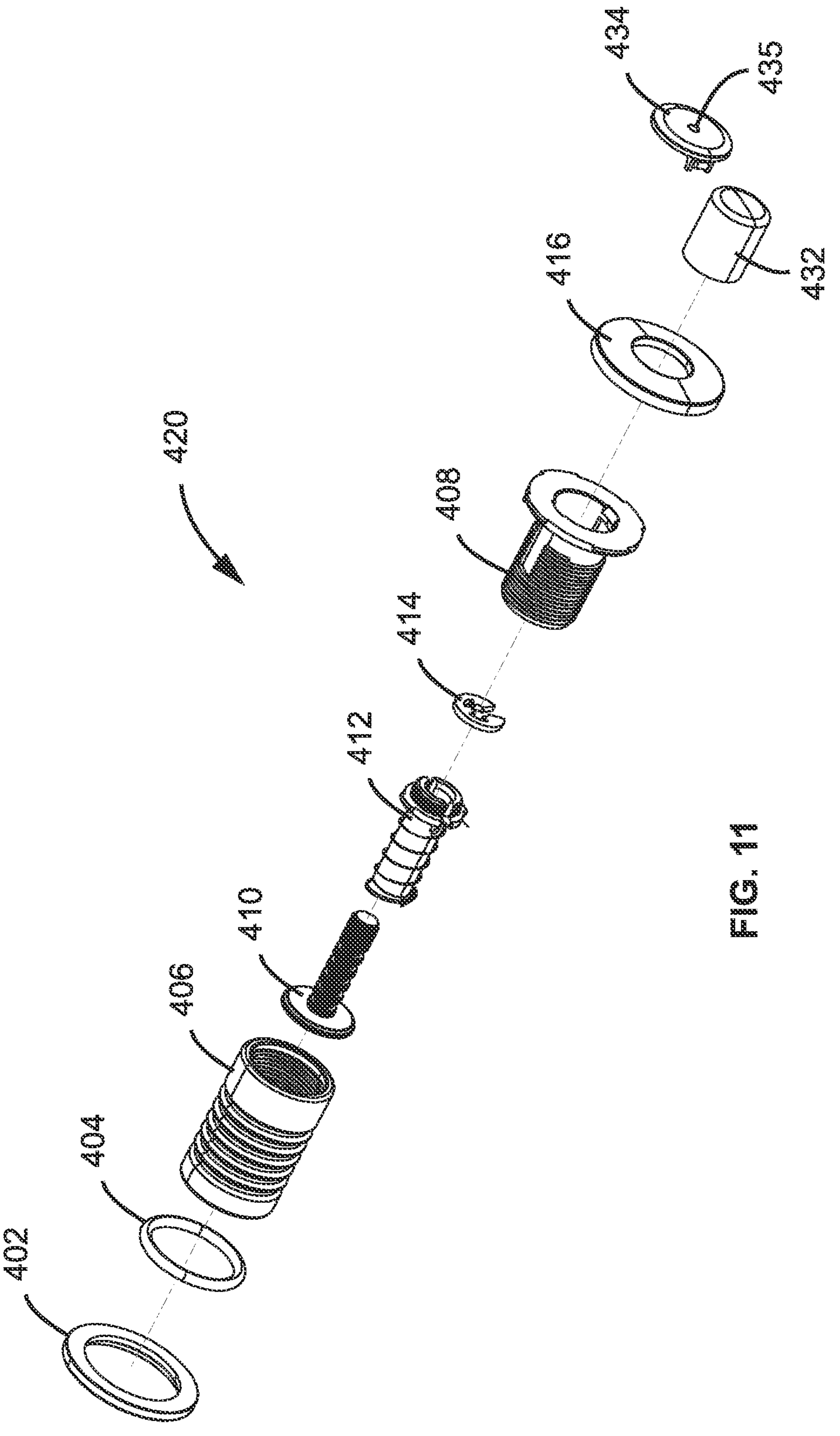
FIG. 11 illustrates an exploded view of the plunger retention assembly of FIG. 10.

FIG. 11 shows an exploded view of the plunger retention assembly 420. The plunger retention assembly 420 includes the flange 402, a flange seal 404, an outer body 406, an inner body 408, a plunger 410, a plunger receiver 412, a clip 414, user side trim 416, the pushbutton 432, and an alternative faceplate 434 that includes an unlock feature 435.

Figure 12:
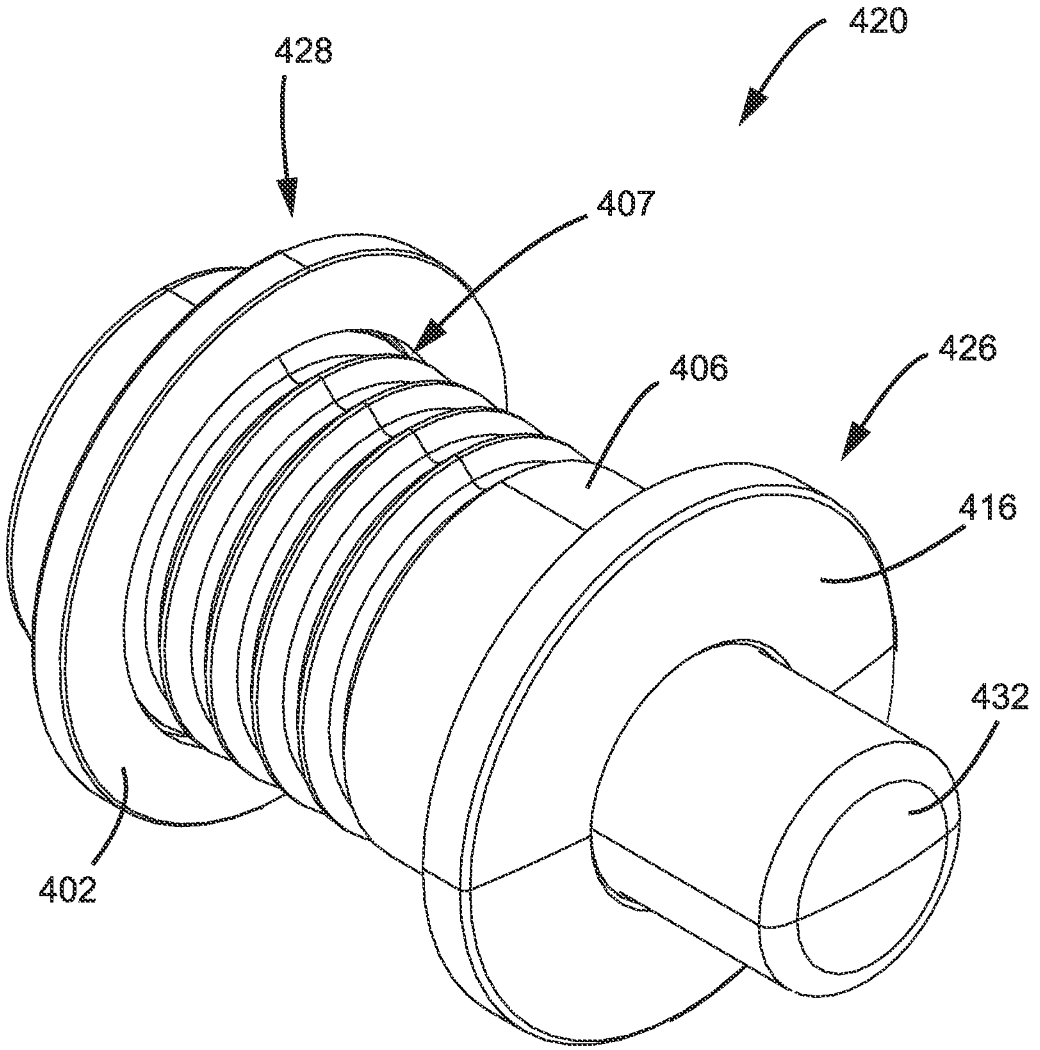
FIG. 12 illustrates a perspective view of the plunger retention assembly of FIG. 10.
Figure 13:
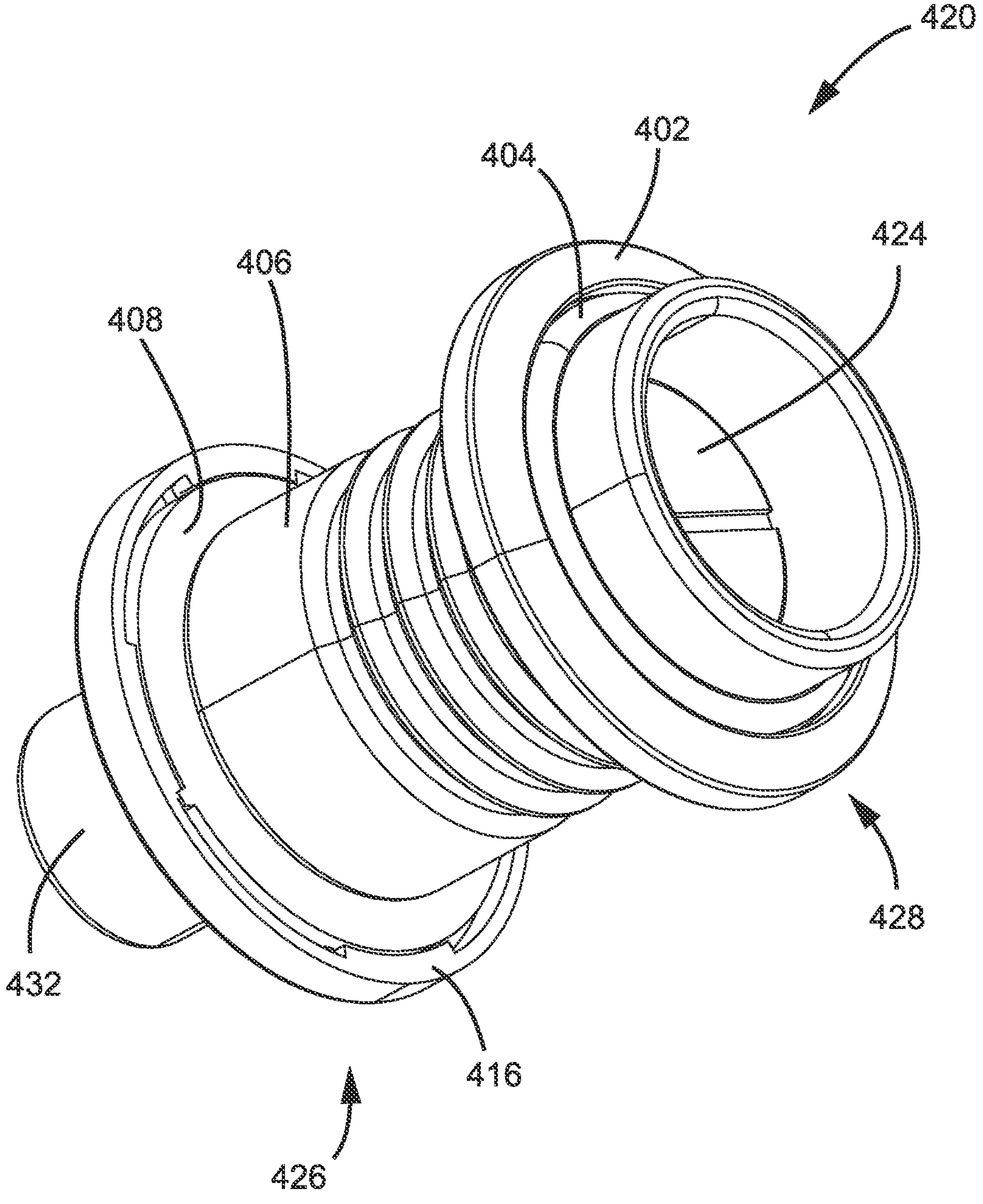
FIG. 13 illustrates another perspective view of the plunger retention assembly of FIG. 10.

FIGS. 12 and 13 show perspective views of the plunger retention assembly 420. The plunger retention assembly 420 includes a first end 428 and a second end 426. As shown, the user side trim 416 is installable on the inner body 408 at second end 426. In some examples, the user side trim 416 is integral with the inner body 408. Further, the flange 402 and flange seal 404 are installed on the outer body 406 at a first position 407 at the first end 428 of the plunger retention assembly 420. In the depicted embodiment, the flange 402 and flange seal 404 have a plurality of positions depending on the thickness T of the door A.

FIG. 13 shows the plunger 410 positioned within an interior 418 of the plunger retention assembly 420. Specifically, a latch plunger engagement member 424 of the plunger 410 is configured to selectably extend from the interior 418 to unlock the door A.

Figure 14:
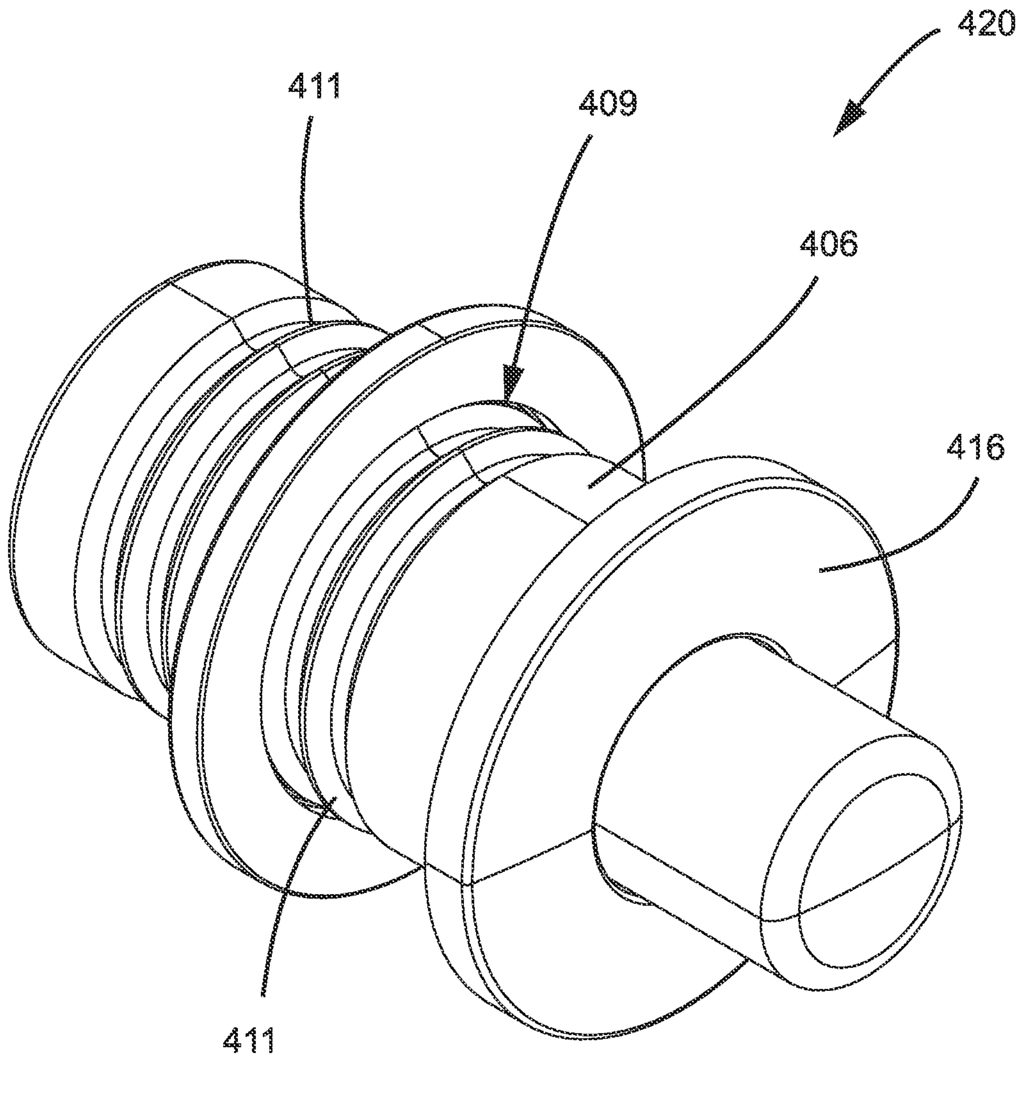
FIG. 14 illustrates a perspective view of the plunger retention assembly of FIG. 10 with a flange in a second position.

FIG. 14 shows the flange 402 and flange seal 404 installed on the outer body 406 at a second position 409, different from the first position 407. In some examples, the flange 402 is secured to the outer body 406 (e.g., threaded) at a position that depends on the thickness T of the door A, and the flange seal 404 is positioned adjacent the flange 402. In some examples, the flange 402 is positioned around the outer body 406 and the flange seal 404 is positioned in an outer body recess 411 to hold the flange 402 around the outer body 406. In some examples, the outer body 406 has a plurality of outer body recesses 411 that correspond to different thicknesses of doors.

Figure 15:
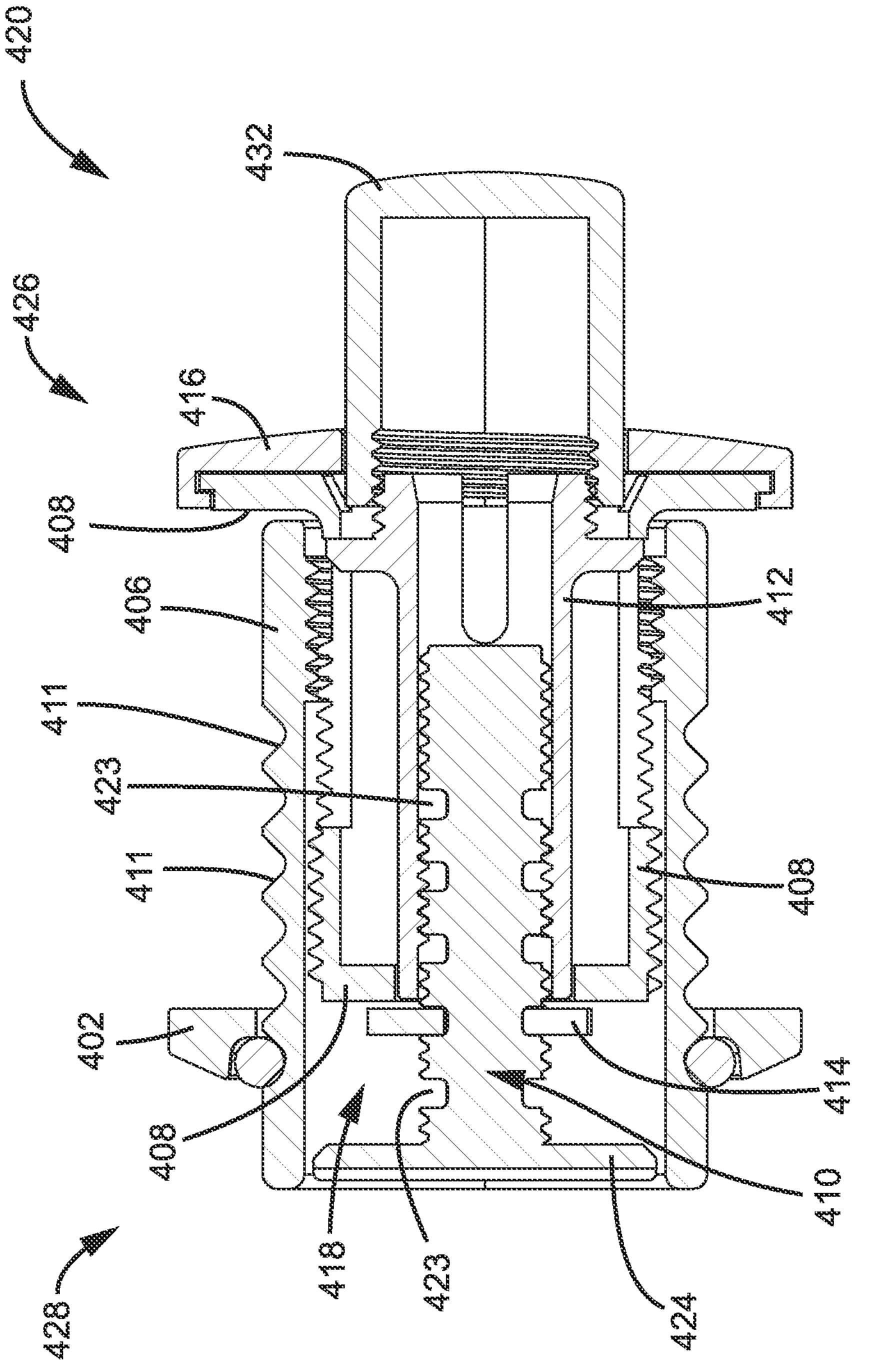
FIG. 15 illustrates a longitudinal cross-sectional view of the plunger retention assembly of FIG. 10.

FIG. 15 shows a cross-sectional view of the plunger retention assembly 420. As shown, the outer body 406 is attached (e.g., by threads) to the inner body 408. The plunger receiver 412 is slidably positioned within the inner body 408 and the plunger 410 is attached inside of the plunger receiver 412. The clip 414 is positioned around a rod 422 of the plunger 410 in one of a plurality of grooves 423 to prevent the rod 422 from extending further into the plunger receiver 412. The clip 414 aids in setting how far the plunger 410 extends from the interior 418 of the plunger retention assembly 420 as the clip bottoms out on the plunger receiver 412 and, in some embodiments, the inner body 408. The pushbutton 432 is connected to the plunger receiver 412, and therefore the plunger 410, so that the plunger 410 moves with the pushbutton. In some examples, the pushbutton 432 is spring loaded.

Figure 16:
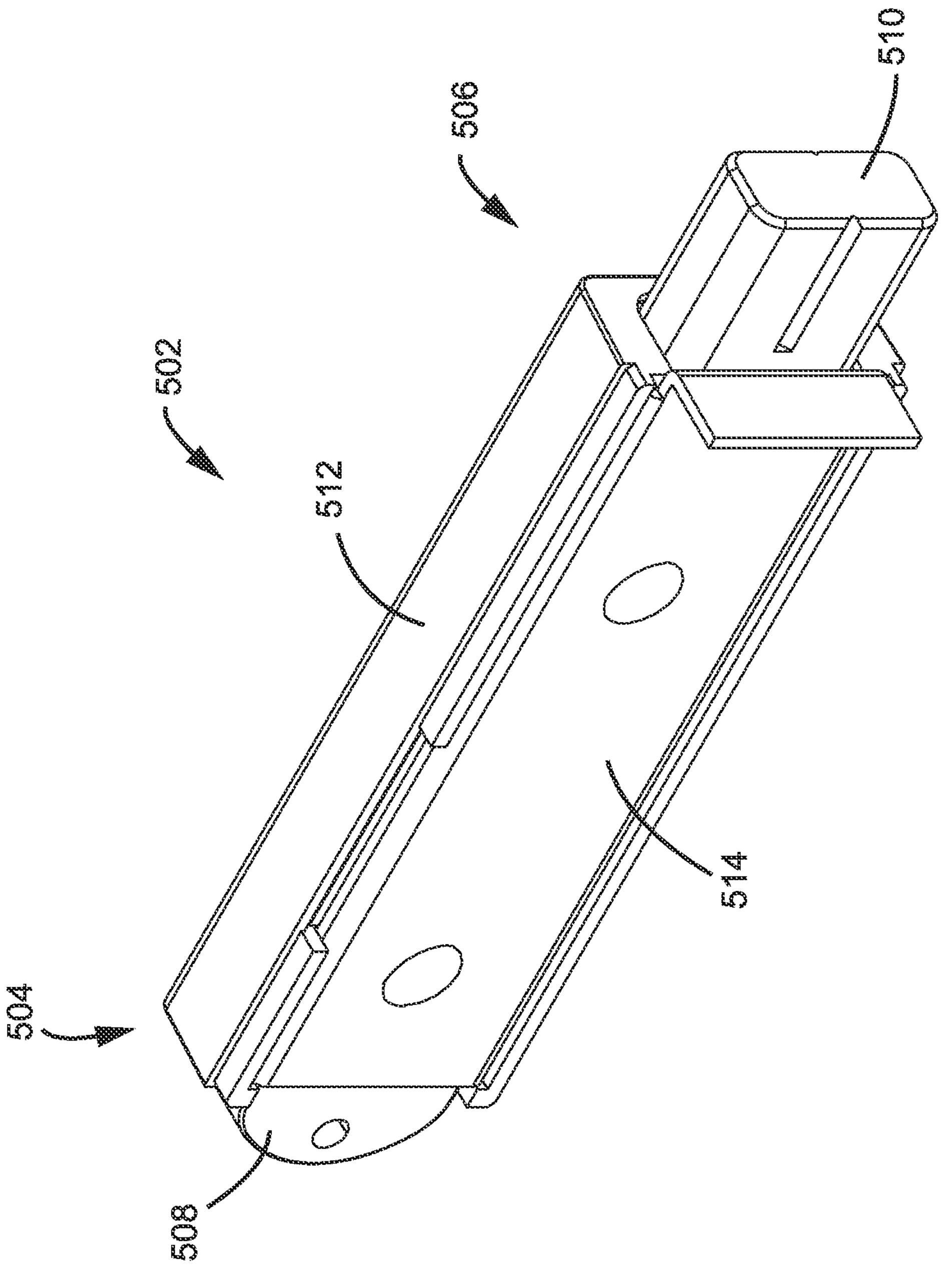
FIG. 16 illustrates an example embodiment of a latch assembly.

FIG. 16 shows a perspective view of a latch assembly 502. The latch assembly 502 is substantially similar to the latch assembly 102, described above. The latch assembly 502 includes a first end 504, a second end 506, an unlock feature 508, a latch plunger 510, a first cover 512, and a second cover 514. The latch assembly 502 is configured to mount to the door jamb B and configured to move between locked and unlocked positions when the latch plunger 510 is moved along a longitudinal axis of the latch assembly 502. In some examples, the unlock feature 508 can be connected to a handle (e.g., handle 130). The latch plunger 510 is configured to selectably interface with the plunger 410 of the plunger retention assembly 420 and extend from the first end 504 and/or the second end 506 of the latch assembly 502. When locked, the latch plunger 510 extends into the interior 418 of the plunger retention assembly 420. When unlocked, the latch plunger 510 does not extend into the interior 418 of the plunger retention assembly 420.

Figure 17:
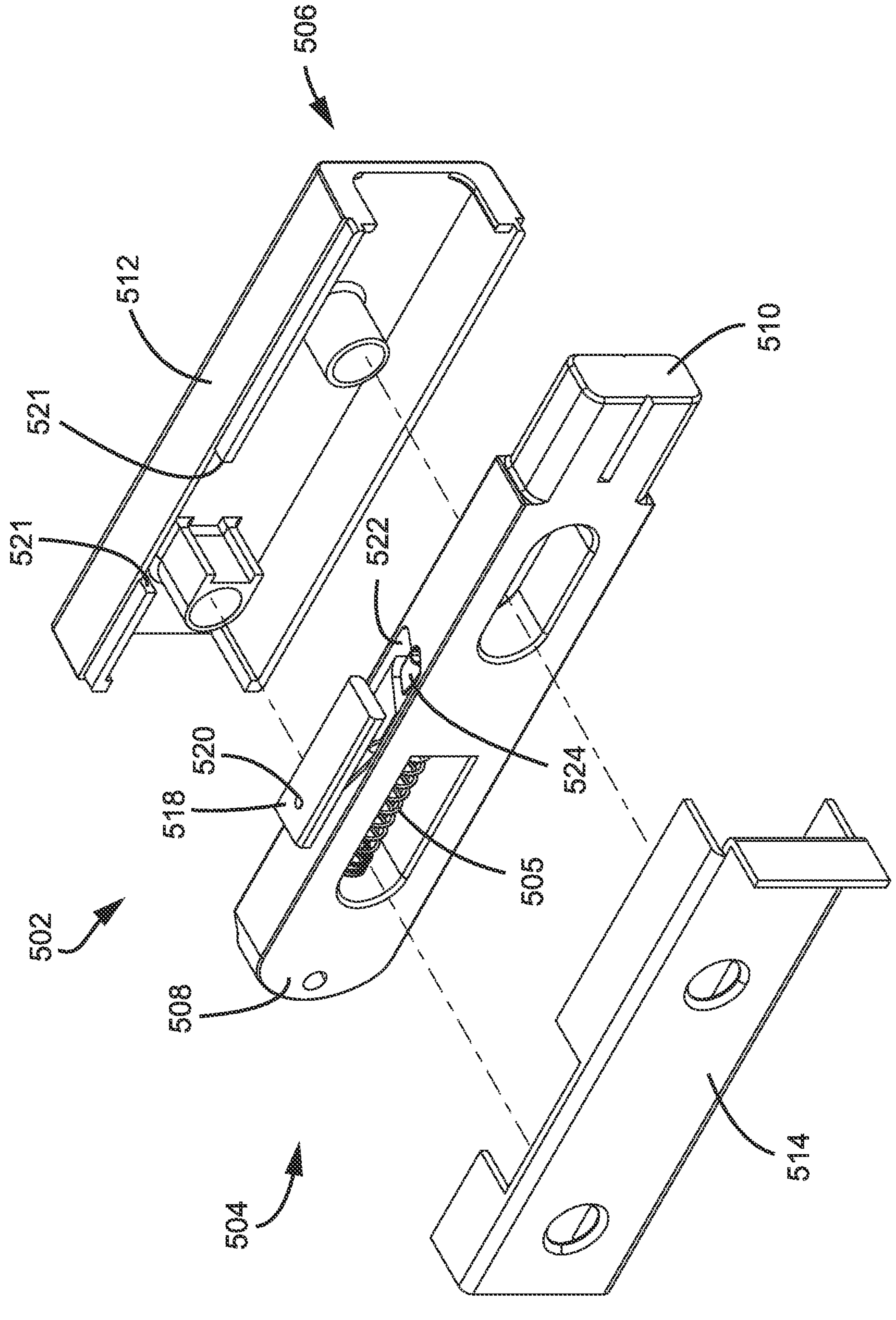
FIG. 17 illustrates an exploded view of the latch assembly of FIG. 16.

FIG. 17 shows a partially exploded view of the latch assembly 502 with the first and second covers 512, 514 removed from a main body 516 of the latch assembly 502. The main body 516 includes a block 518 attached thereto. The block 518 functions similar to the block 302 described above. The block 518 is configured to interface with an aperture 521 of the first cover 512 as the latch plunger 510, and therefore the main body 516, moves longitudinally within the first and second covers 512, 514. The block 518 is connected to a connecting member 520 and the block 518 moves the connecting member 520 within a slot 522 to selectively engage a guide member 524. In some examples, movement of the main body 516 is spring loaded with the help of a spring 505 that interfaces with at least one of the first and second covers 512, 514 and the main body 516.

Figure 18:
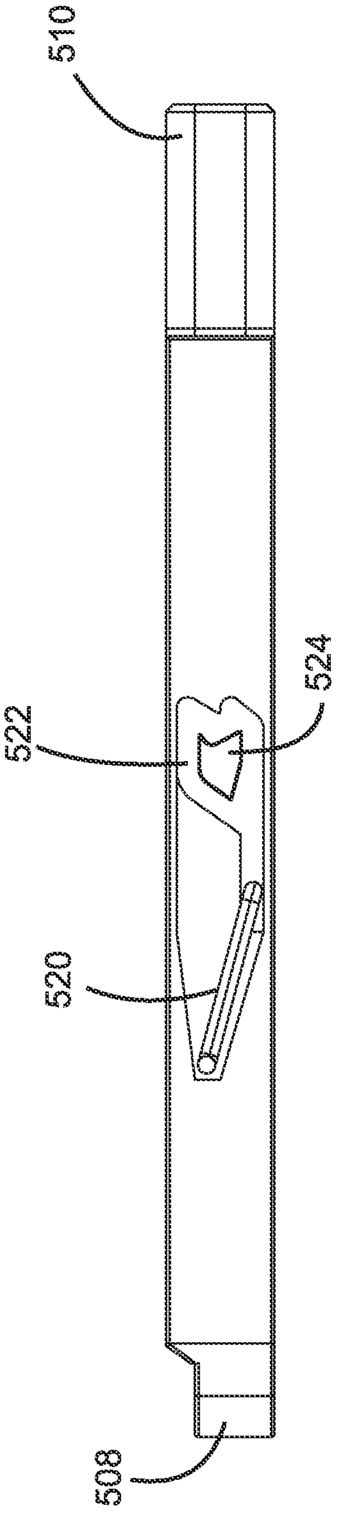
FIG. 18 illustrates a top view of the latch assembly of FIG. 16.

FIG. 18 shows a side view of the main body 516 of the latch assembly 502. In some examples, the view is the top view of the main body 516 and, in other examples, the view is the bottom view of the main body 516. The block 518 is not shown for illustration purposes, but the guide member 524 moves within the slot 522, much like the guide member 306 described above, as the latch plunger 510 moves longitudinally within the latch assembly 502. As the guide member 524 and connecting member 520 go into and out of engagement with one another, the latch assembly 502 is moved between an extended position and a retracted position. The latch assembly 502 operates in a similar fashion to the latch assembly 102, specifically regarding the movement of the connecting member 304 and guide member 306 as described above.

Figure 19:
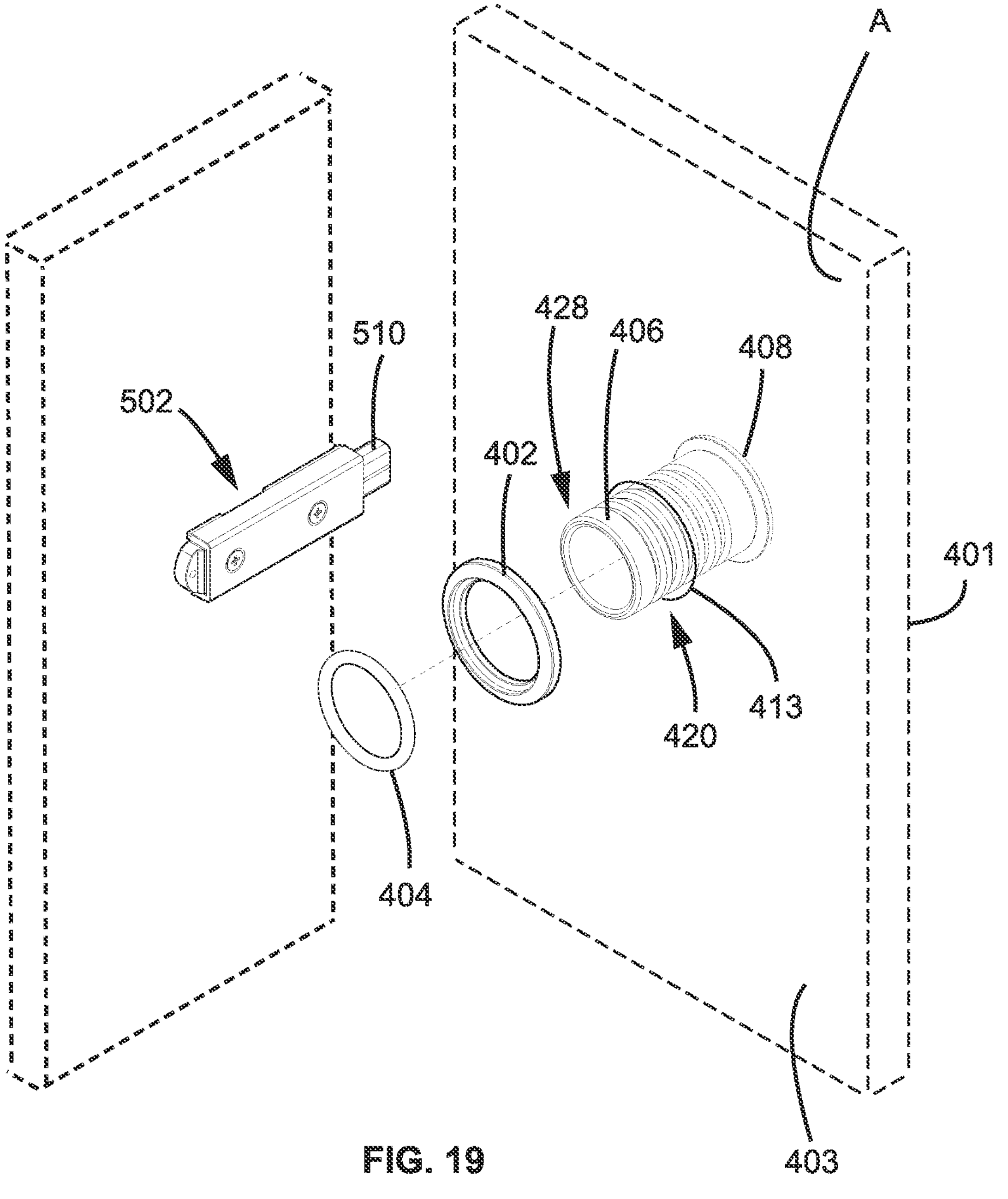
FIG. 19 illustrates a perspective view of the installation of the plunger retention assembly of FIG. 10.

FIG. 19 shows the plunger retention assembly 420 being installed on the door A. The outer body 406 is first positioned within a bore 413 of the door A and the outer body 406 is positioned so that the first end 428 aligns with the latch plunger 510 of the latch assembly 502 so that the latch plunger 510 is positioned to enter the interior 418 of the plunger retention assembly 420. If adjustment is needed, the user can either rotate the outer body 406 clockwise to reduce the distance the outer body 406 extends from the door jamb side 403 of the door A, or rotate the outer body 406 counter-clockwise to increase the distance the outer body 406 extends from the door jamb side 403 of the door A. This is made possible because the inner body 408 is threaded into the outer body 406, and therefore rotation of the outer body 406 extends or retracts the overall length of the plunger retention assembly 420.

The outer body 406 is shown to contain the components of the plunger retention assembly 420, except for the flange 402 and the flange seal 404. When the outer body 406 is at the desired position within the bore 413, the flange 402 is positioned around the outer body 406 until the flange 402 is positioned immediately adjacent the door jamb side 403 of the door A. The flange seal 404 is then positioned around the outer body 406 and positioned immediately adjacent the flange 402.

Figure 20:
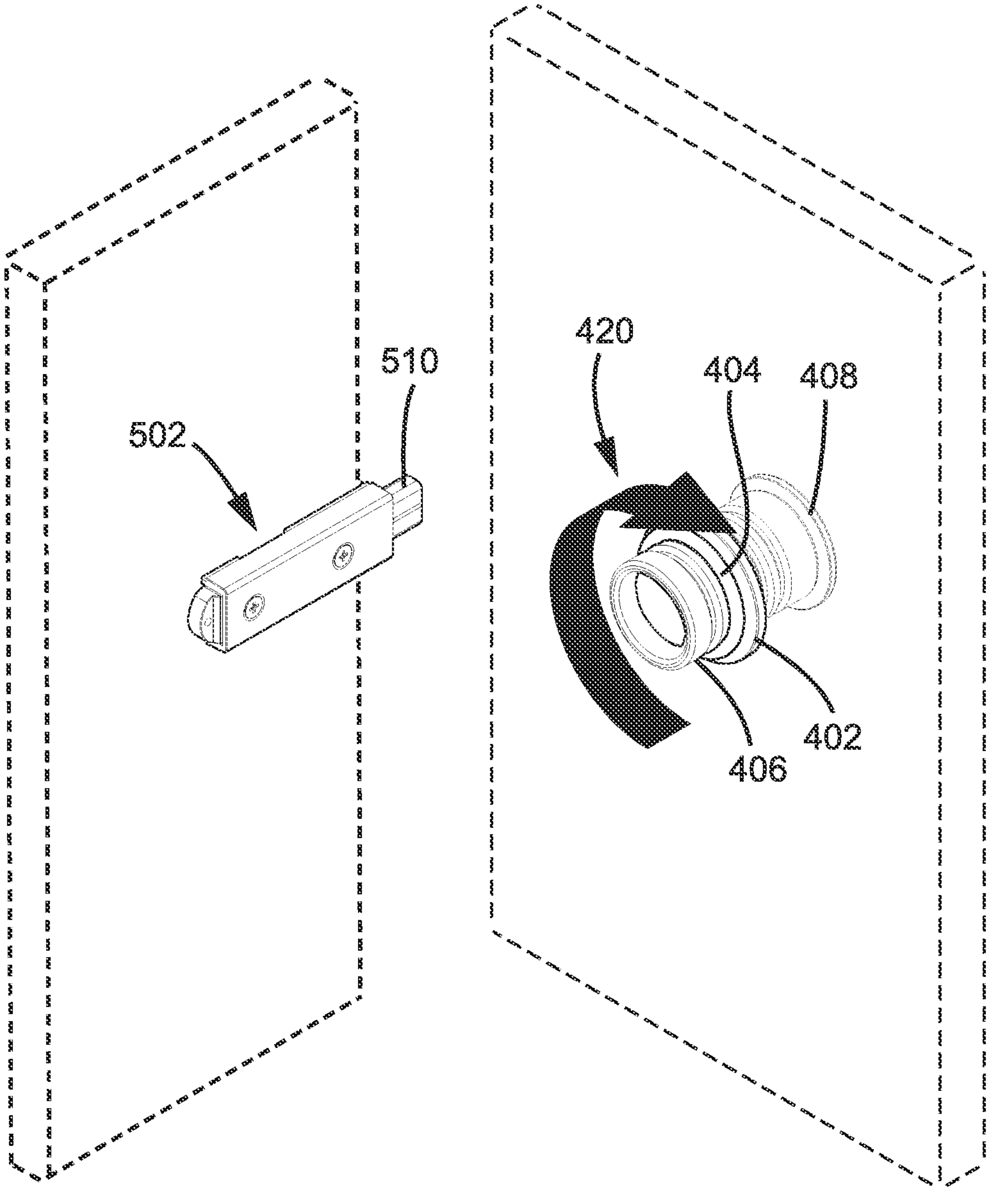
FIG. 20 illustrates another perspective view of the installation of the plunger retention assembly of FIG. 10.

FIG. 20 shows the further optional step of installing and positioning the plunger retention assembly 420 on the door A. Once the flange 402 and flange seal 404 are positioned around the outer body 406, the user rotates the outer body 406 (e.g., clockwise) to securely fasten the plunger retention assembly 420 with the door A. By rotating the outer body 406 clockwise when the flange 402 is positioned against the door jamb side B of the door, the plunger retention assembly 420 tightens against the door A between the flange 402 on the door jamb side B of the door A and the inner body 408 of the user side 401 of the door A.

Figure 21:
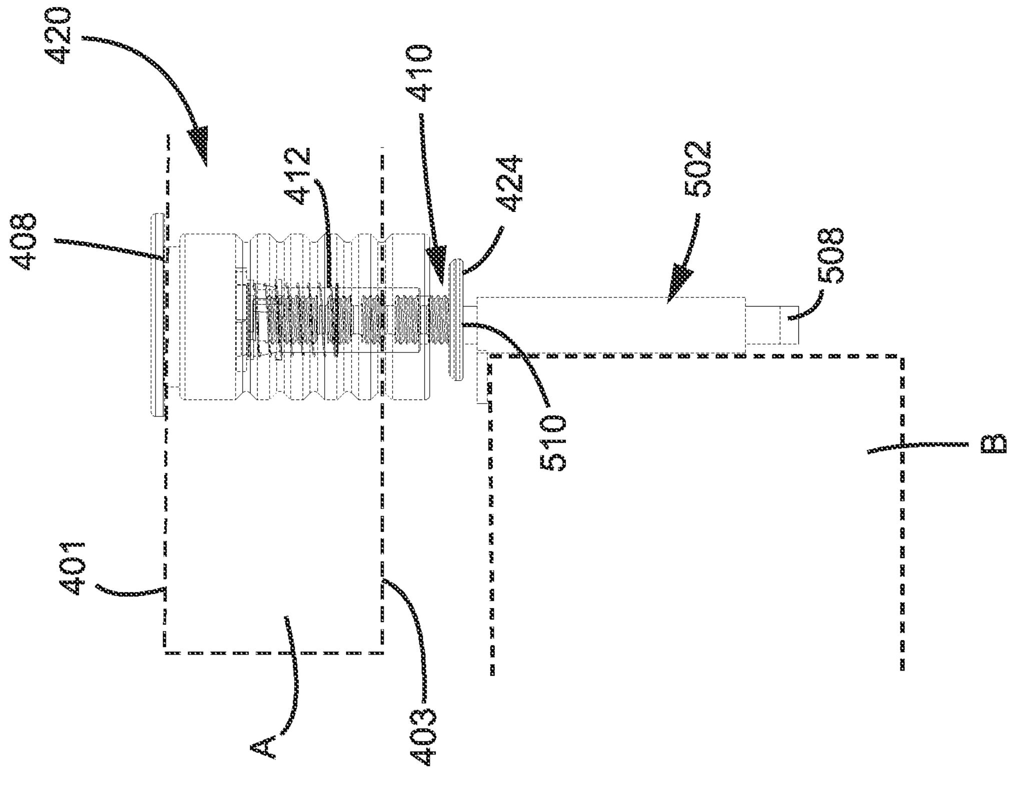
FIG. 21 illustrates another perspective view of the installation of the plunger retention assembly of FIG. 10 with the plunger in the aligned position.

FIG. 21 shows the proper positioning of the plunger 410 of the plunger retention assembly 420 and the position of the latch plunger 510 when the latch plunger 510 is retracted. Specifically, the latch plunger engagement member 424 of the plunger 410 is configured to selectably extend and interface with the retracted plunger 510 of the latch assembly 502.

Figure 22:
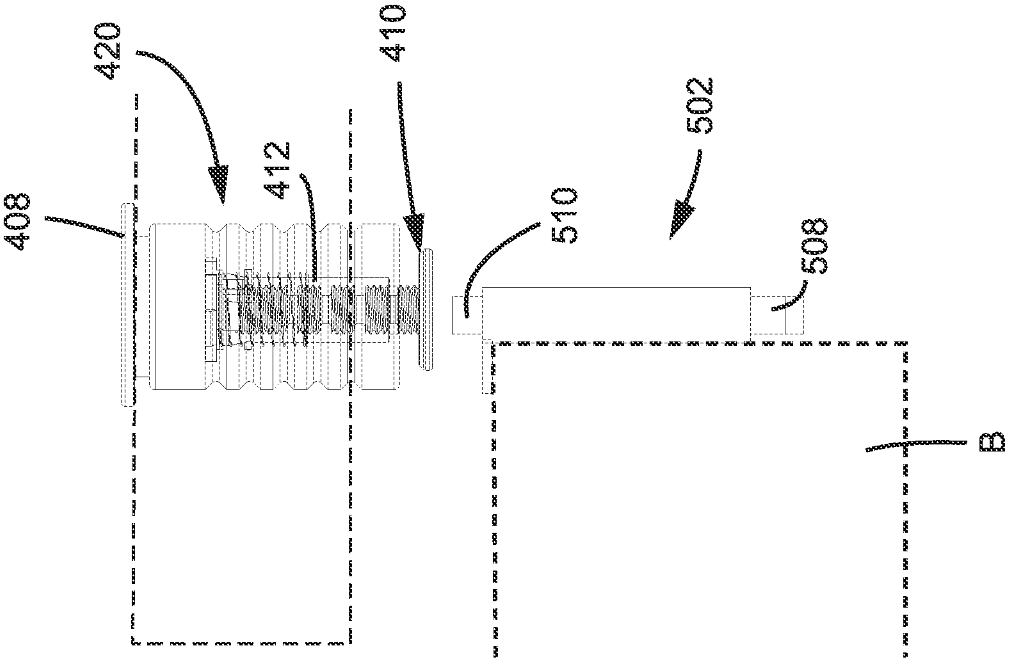
FIG. 22 illustrates another perspective view of the installation of the plunger retention assembly of FIG. 10 with the plunger in the misaligned position.

FIG. 22 shows the improper positioning of the plunger 410 of the plunger retention assembly 420 and the position of the latch plunger 510 when the latch plunger 510 is retracted. Specifically, the latch plunger engagement member 424 of the plunger 410 does not interface with the retracted plunger 510 of the latch assembly 502. To adjust the distance the plunger 410 extends, the plunger 410 is rotated into, or out of, the plunger receiver 412.

Figure 23:
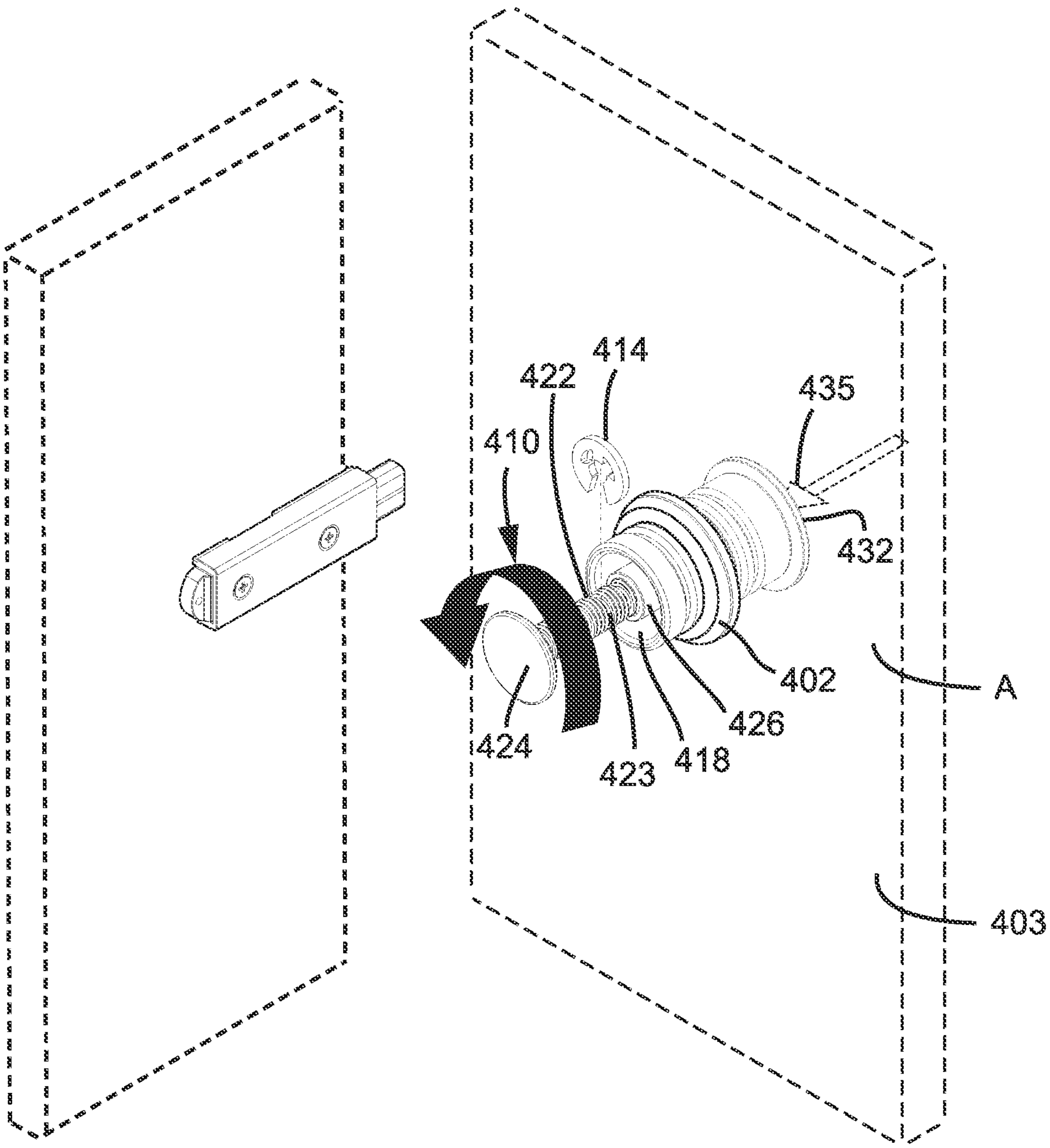
FIG. 23 illustrates another perspective view of the installation of the plunger retention assembly of FIG. 10.
Figure 24:
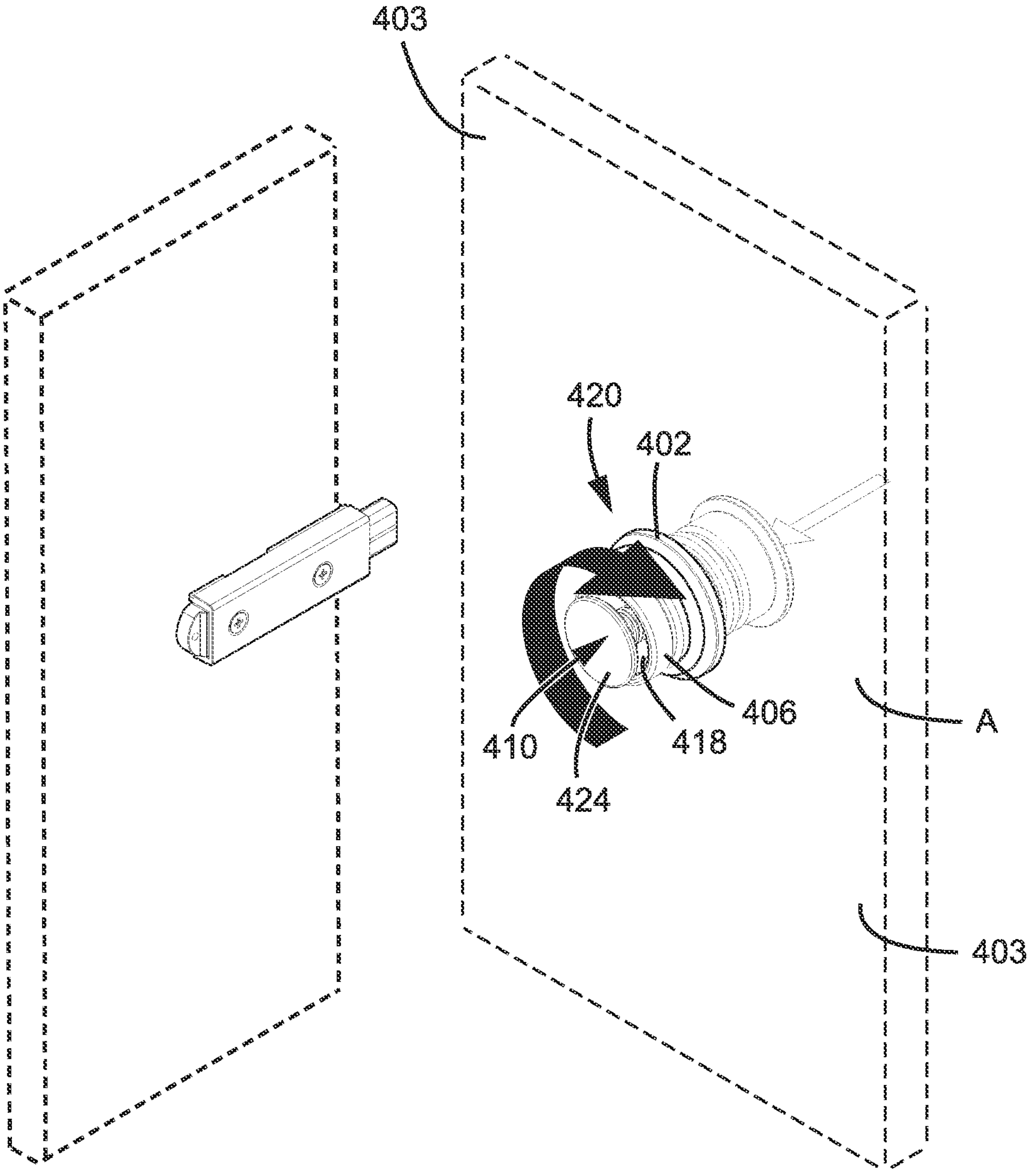
FIG. 24 illustrates another perspective view of the installation of the plunger retention assembly of FIG. 10.

FIG. 23 shows adjusting the length of the plunger 410 during installation. In some examples, the clip 414 can be used to ensure the plunger 410 does not accidently move too far into the plunger receiver 412. Upon depressing the pushbutton 432/unlock feature 435 on the user side 401 of the door A, the user installs the clip 414 into the groove 423 on the rod 422 of the plunger 410. In some examples, the plunger 410 is partially rotated counter-clockwise to allow for the clip 414 to be installed. Once the plunger 410 is rotated clockwise so that the clip interfaces with plunger receiver, as shown in FIG. 24, the clip 414 will not pass into the plunger receiver 412 and the clip 414 will prevent the rod 422 from traveling further into the plunger receiver 412. This positioning is also shown in FIG. 15.

EXAMPLES

Illustrative examples of the sliding door lockset herein are provided below. An embodiment of the sliding door lockset may include any one or more, and any combination of, the examples described below.

In Example 1, a lockset for a sliding door comprises a latch assembly having a first end and a second end and a plunger positioned at least partially within the latch assembly, the plunger movable between an extended position and a retracted position relative to the second end of the latch assembly. The lockset also includes a plunger retention assembly comprising a first end having a recess, a second end opposing the first end, and an actuation member positioned at least partially within the plunger retention assembly. The plunger is configured to engage the recess in the extended position.

In Example 2, the lockset of Example 1 is modified in that the plunger comprises a handle on a first end, the handle in communication with the plunger to move the plunger between the retracted position and the extended position.

In Example 3, the lockset of Example 2 is modified in that the plunger retention assembly comprises a faceplate on the second end.

In Example 4, the lockset of Example 3 is modified in that the faceplate comprises an emergency secondary unlock feature.

In Example 5, the lockset of Example 2 is modified in that the plunger retention assembly comprises a rod extending through the plunger retention assembly, the actuation member having a first end connected to the rod, and a second end forming the recess of the plunger retention assembly.

In Example 6, the lockset of Example 1 is modified in that the plunger retention assembly comprises a pushbutton on the second end, the pushbutton capable of moving the plunger between the retracted position and the extended position.

In Example 7, the lockset of Example 6 is modified in that the pushbutton is connected to a rod extending through the plunger retention assembly. The rod is configured to engage the plunger to move the plunger between the retracted position and the extended position.

In Example 8, the lockset of Example 6 is modified in that the plunger comprises a secondary unlock feature on the first end.

In Example 9, the lockset of Example 6 is modified in that the pushbutton is spring-loaded.

In Example 10, a sliding door lock comprises a latch assembly having a first end and a second end and a plunger positioned at least partially within the latch assembly, the plunger movable between an extended position and a retracted position relative to the second end of the latch assembly. The sliding door lock also includes a handle located on a first end of the plunger, the handle being in communication with the plunger to move the plunger between the retracted position and the extended position. The sliding door lock further includes a plunger retention assembly comprising a first end having a recess, a second end having a faceplate, and an actuation member positioned at least partially within the plunger retention assembly. The plunger is configured to engage the recess in the extended position.

In Example 11, the sliding door lock of Example 10 is modified in that the faceplate comprises an emergency unlock feature.

In Example 12, the sliding door lock of Example 11 is modified in that upon actuation of the emergency unlock feature, a rod is inserted into the emergency unlock feature to cause the plunger to move from the extended position to the retracted position.

In Example 13, the sliding door lock of Example 10 is modified in that the plunger retention assembly is configured to be installed in a door jamb.

In Example 14, the sliding door lock of Example 10 is modified in that the latch assembly is configured to be installed in a bore located within a door.

In Example 15, the sliding door lock of Example 10 is modified in that actuating the handle causes the plunger to move between the extended position and the retracted position along a first axis, wherein the first axis is perpendicular to a door.

In Example 16, a sliding door lock comprises a latch assembly having a first end and a second end and a latch plunger positioned at least partially within the latch assembly, the latch plunger movable between an extended position and a retracted position relative to the second end of the latch assembly. The sliding door lock also includes a plunger retention assembly comprising a first end having a recess, a second end, and an plunger comprising a rod and positioned at least partially within the plunger retention assembly. The plunger retention assembly includes a pushbutton on the second end, the pushbutton being connected to the rod and extending through the plunger retention assembly. The plunger moves the latch plunger between the retracted position and the extended position, and the latch plunger is configured to engage the recess in the extended position.

In Example 17, the sliding door lock of Example 16 is modified in that the latch plunger comprises an emergency unlock feature on the first end.

In Example 18, the sliding door lock of Example 16 is modified in that the pushbutton is spring-loaded.

In Example 19, the sliding door lock of Example 16 is modified in that actuating the pushbutton along a first axis causes the plunger to move between the extended position and the retracted position along the first axis, wherein the first axis is perpendicular to a door.

In Example 20, the sliding door lock of Example 16 is modified in that the latch assembly comprises a biasing block and a guide member connected to a connecting member, wherein the biasing block and the guide member control a spring.

In Example 21, a plunger retention assembly for a sliding door comprises a first body positioned at a first end and a second body positioned at a second end, the first body and the second body being connected to one another and forming an interior of the plunger retention assembly. The plunger retention assembly also includes a plunger positioned at least partially within the interior, the plunger at least partially extending a user definable distance from the first end. The plunger retention assembly further includes a pushbutton movably positioned at the second end, the pushbutton being connected to the plunger within the interior. Upon movement of the pushbutton into the interior, the plunger extends further from the first end.

In Example 22, the plunger retention assembly of Example 21 is modified in that the first body is an outer body and the second body is an inner body, and wherein the inner body is threaded into the outer body.

In Example 23, the plunger retention assembly of Example 21 is modified to further include a flange and a flange seal. The flange is positionable around the first body and the flange seal is positionable immediately adjacent the flange to reduce relative axial movement between the first body and the flange.

In Example 24, the plunger retention assembly of Example 22 is modified in that the flange seal is positioned within one of a plurality of recesses defined in the first body.

In Example 25, the plunger retention assembly of Example 21 is modified in that the plunger includes a latch plunger engagement member and a rod, wherein the rod includes a plurality of grooves, each of the grooves being configured to receive a clip.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

We claim:

1. A lockset comprising:

a latch assembly configured to mount on a door jamb, the latch assembly including:

a main body having a first end and a second end defining a longitudinal axis; and a latch plunger disposed at least partially within the main body and slidable along the longitudinal axis, the latch plunger is capable of extending through the first end and the second end of the main body such that each axial end of the latch plunger is accessible on the door jamb, the latch plunger moveable between at least an extended position and a retracted position relative to the first end of the main body, wherein the latch plunger is spring biased within the main body; and a plunger retention assembly configured to mount on a sliding door, the plunger retention assembly including:

a retention body having a first end and a second end;

a plunger engagement member disposed within the retention body proximate the first end of the retention body and selectively slidable with respect to the retention body, wherein the plunger engagement member and the first end of the retention body define a recess configured to at least partially receive the latch plunger when in the extended position and lock the sliding door relative to the doorjamb; and a pushbutton coupled to the second end of the retention body and configured to move the plunger engagement member towards the first end of the retention body and push the latch plunger out of the recess and towards the retracted position, wherein the pushbutton is operable to move the latch plunger between the extended position and the retracted position.

2. The lockset of claim 1, wherein the latch assembly further includes a handle coupled to the latch plunger proximate the second end of the main body.

3. The lockset of claim 1, wherein the latch plunger includes a latch unlock feature proximate the second end of the main body.

4. The lockset of claim 1, wherein the spring bias of the latch plunger includes a block movable along the longitudinal axis, a spring, a guide member, and a connecting member coupled to the block and selectively engageable with the guide member.

5. The lockset of claim 1, wherein the pushbutton is configured to move the plunger engagement member at least partially out of the first end of the retention body and selectively engage the latch plunger.

6. A lockset comprising:

a latch assembly configured to mount on a door jamb, the latch assembly including:

a main body;

a latch plunger disposed at least partially within the main body and slidable relative to the main body, the latch plunger having an end that is moveable between at least an extended position and a retracted position relative to the main body; and a plunger retention assembly including:

a retention body having a first end configured to mount on a door jamb side of a sliding door and a second end configured to mount on a user side of the sliding door, the retention body also having an interior that extends along a longitudinal axis defined between the first end and the second end, the first end and the second end moveably attached to each other along the longitudinal axis for accommodating different sliding door widths;

a plunger engagement member having a disc and a rod extending therefrom, the plunger engagement member disposed within the retention body proximate the first end and selectively slidable along the longitudinal axis, wherein the disc of the plunger engagement member and the first end of the retention body define a recess configured to at least partially receive the end of the latch plunger when in the extended position and lock the sliding door relative to the doorjamb; and a pushbutton coupled to the second end of the retention body and configured to engage with the rod to move the plunger engagement member towards the first end and push the end of the latch plunger out of the recess and towards the retracted position, wherein the pushbutton extends from the second end of the retention body, and the pushbutton is operable to move the latch plunger between the extended position and the retracted position via the plunger engagement member.

7. The lockset of claim 6, wherein the retention body includes an outer body forming the first end and an inner body forming the second end.

8. The lockset of claim 7, wherein the outer body and the inner body are threadably coupled together.

9. The lockset of claim 7, wherein the rod includes a plurality of axial spaced grooves, wherein the plunger engagement member further includes a clip configured to engage with each of the plurality of axial spaced grooves so as to define a position of the disc relative to the first end of the retention body.

10. The lockset of claim 7, wherein the pushbutton is slidably coupled to the inner body and the pushbutton is coupled to the rod such that longitudinal movement of the pushbutton drives movement of the plunger engagement member.

11. The lockset of claim 6, wherein the plunger engagement member is spring biased within the retention body.

12. The lockset of claim 6, further comprising a trim plate coupled to the second end of the retention body.

13. The lockset of claim 6, wherein the pushbutton includes a plunger receiver coupled directly to the rod of the plunger engagement member.

14. A method of installing a lockset comprising:

mounting a latch assembly on a door jamb, the latch assembly having a latch plunger configured to be moveable between at least an extended position and a retracted position relative to the doorjamb;

providing a bore within a sliding door that aligns with the latch assembly when the sliding door is closed with respect to the doorjamb; and mounting a plunger retention assembly at the bore of the sliding door, wherein mounting the plunger retention assembly includes:

positioning a first end of a retention body on a door jamb side of the sliding door and a second end of the retention body on a user side of the sliding door;

adjusting an extension length of the first end of the retention body from the door jamb side;

adjusting a recess distance of a plunger engagement member disposed within the retention body relative to the first end of the retention body; and coupling a pushbutton to the second end of the retention body, wherein the pushbutton extends from the second end of the retention body, and the pushbutton is operable to move the latch plunger between the extended position and the retracted position via the plunger engagement member.

15. The method of claim 14, wherein adjusting the extension length of the first end of the retention body includes rotating an outer body of the retention body relative to an inner body of the retention body.

16. The method of claim 14, wherein positioning the first end of the retention body on the door jamb side includes tightening a flange around the retention body.

17. The method of claim 14, wherein adjusting the recess distance of the plunger engagement member includes positioning a clip relative to a rod of the plunger engagement member.

18. The method of claim 14, further comprising attaching a trim plate to the second end of the retention body.

* * * * *